US011765555B1

(12) United States Patent
Babaei

(10) Patent No.: US 11,765,555 B1
(45) Date of Patent: Sep. 19, 2023

(54) PACKET DATA CONVERGENCE PROTOCOL (PDCP) ENHANCEMENT FOR MULTICAST AND BROADCAST SERVICES

(71) Applicant: Toyota Jidosha Kabushiki Kaisha, Aichi-ken (JP)

(72) Inventor: Alireza Babaei, Fairfax, VA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 64 days.

(21) Appl. No.: 17/451,307

(22) Filed: Oct. 18, 2021

Related U.S. Application Data

(60) Provisional application No. 63/094,307, filed on Oct. 20, 2020.

(51) Int. Cl.
*H04W 4/06* (2009.01)
*H04W 80/04* (2009.01)

(52) U.S. Cl.
CPC ............. *H04W 4/06* (2013.01); *H04W 80/04* (2013.01)

(58) Field of Classification Search
None
See application file for complete search history.

(56) References Cited

U.S. PATENT DOCUMENTS

2005/0147040 A1* 7/2005 Vayanos ............... H04L 1/0041 370/278
2016/0057585 A1* 2/2016 Horn .................... H04W 28/12 370/312
2019/0058550 A1* 2/2019 Kim ...................... H04L 1/1825
2019/0387535 A1* 12/2019 Kim ................... H04W 72/1268
2020/0092944 A1* 3/2020 Baek ..................... H04W 80/08
2021/0120526 A1* 4/2021 Zhu ....................... H04W 72/23

FOREIGN PATENT DOCUMENTS

EP      E P-4024911 A1 *  7/2022  ............ H04W 24/02
WO    WO-2019229145 A1 * 12/2019 ......... H04L 43/0835

OTHER PUBLICATIONS

ETSI TS 138 323, "Technical Specification: Packet Data Convergence Protocol (PDCP) specification", 3GPP TS 38.323 version 16.2.0, Release 16, Nov. 2020, 42 pages, downloadable from http://www.etsi.org/standards-search.

* cited by examiner

Primary Examiner — Kenny S Lin
(74) Attorney, Agent, or Firm — Finnegan, Henderson, Farabow, Garrett & Dunner, LLP

(57) ABSTRACT

A system, method and apparatus for mobile communications including sidelink transmissions is provided. A user equipment (UE) determines based on a partial sensing resource allocation process associated with a first window size, first radio resources for one or more first sidelink transport blocks. The UE transmits the one or more first sidelink transport blocks based on the first radio resources. The UE receives hybrid automatic repeat request (HARQ) feedback based on a first number of number of negative acknowledgements (NACKs) and a second number of positive acknowledgements (ACKs). Based on application of a threshold, the UE determines second radio resources for one or more second sidelink transport blocks. The UE transmits the one or more second sidelink transport blocks based on the second radio resources.

31 Claims, 24 Drawing Sheets

| Transport channel / Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3A

| Transport channel / Logical channel | RACH | UL-SCH |
|---|---|---|
| CCCH | | X |
| DCCH | | X |
| DTCH | | X |

FIG. 3B

| Transport channel / Logical channel | SL-BCH | SL-SCH |
|---|---|---|
| SBCCH | X | |
| SCCH | | X |
| STCH | | X |

FIG. 3C

| Physical channel | PDSCH | PDCCH | PBCH |
|---|---|---|---|
| Transport channel | | | |
| BCH | | | X |
| PCH | X | | |
| DL-SCH | X | | |

FIG. 4A

| Physical channel | PUSCH | PUCCH | PRACH |
|---|---|---|---|
| Transport channel | | | |
| UL-SCH | X | | |
| RACH | | | X |

FIG. 4B

| Physical channel | PSSCH | PSCCH | PSFCH | PSBCH |
|---|---|---|---|---|
| Transport channel | | | | |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

PACKET DATA CONVERGENCE PROTOCOL (PDCP) ENHANCEMENT FOR MULTICAST AND BROADCAST SERVICES

CROSS-REFERENCE TO RELATED APPLICATION

This application claims the benefit of U.S. Provisional Application No. 63/094,307, entitled "PACKET DATA CONVERGENCE PROTOCOL (PDCP) ENHANCEMENT FOR MULTICAST AND BROADCAST SERVICES", and filed on Oct. 20, 2020. U.S. Provisional Application No. 63/094,307 is incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
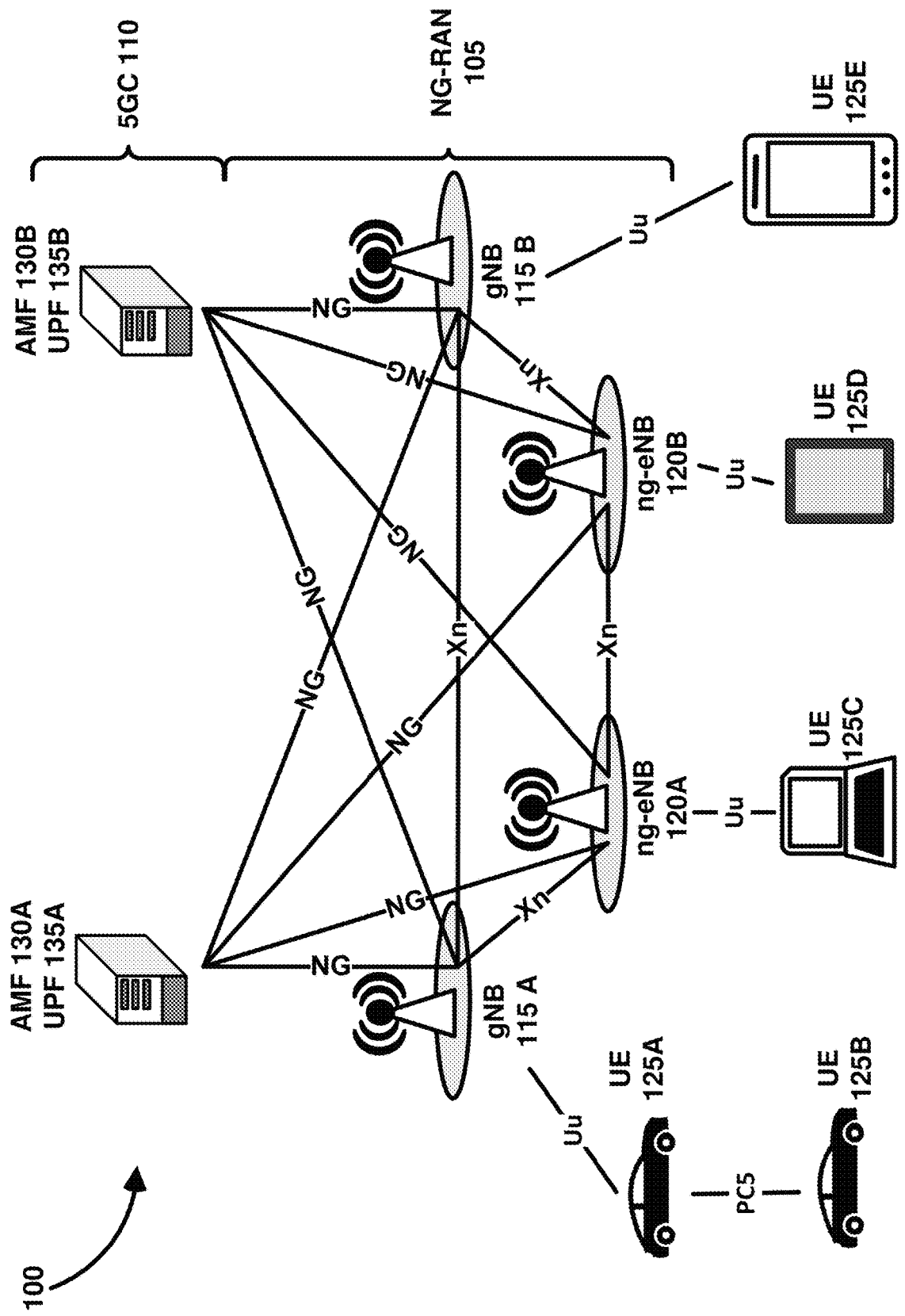
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (JOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type.

During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
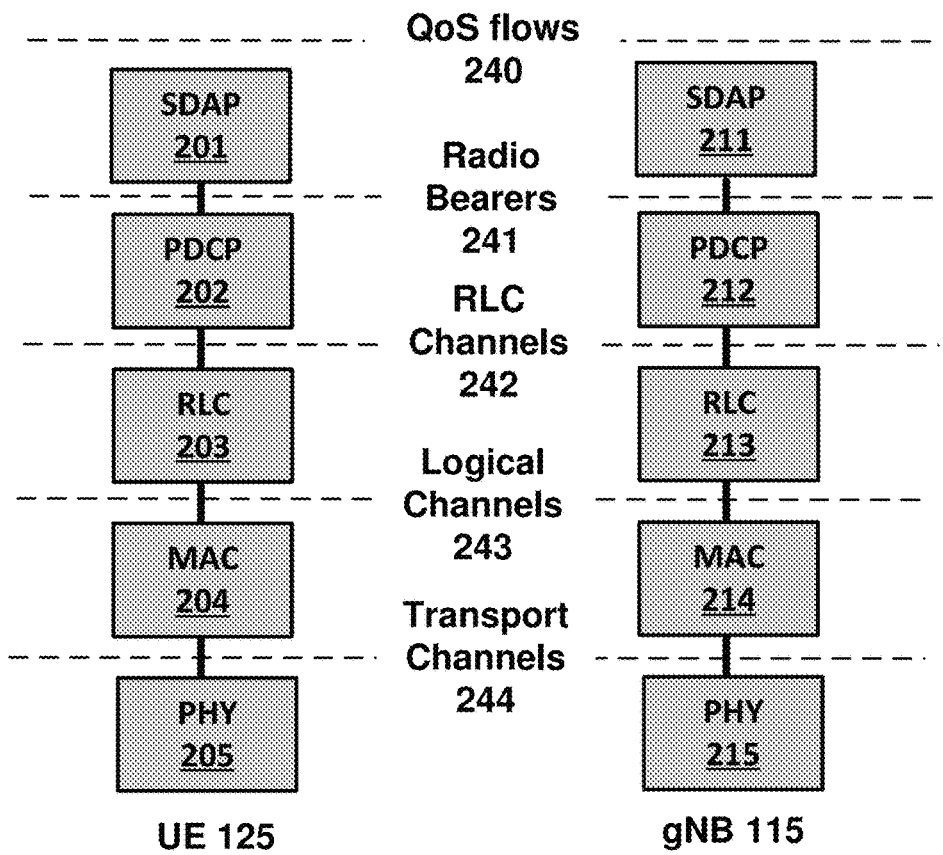
FIG. 2A and FIG. 2B show examples of radio protocol stacks for user plane and control plane, respectively, according to some aspects of some of various exemplary embodiments of the present disclosure.
Figure 2B:
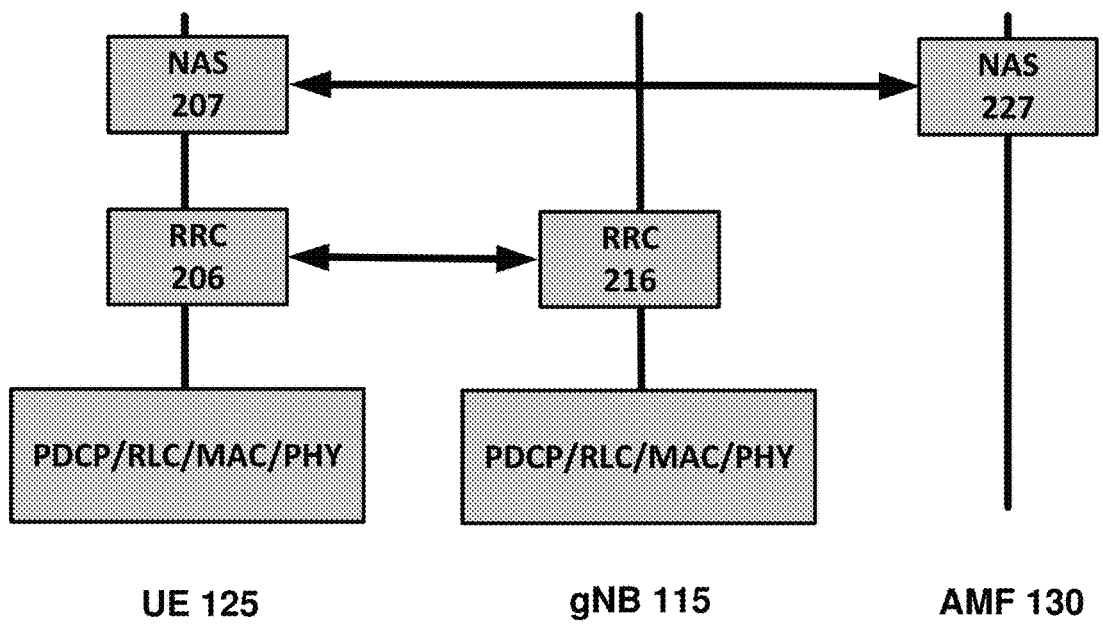

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
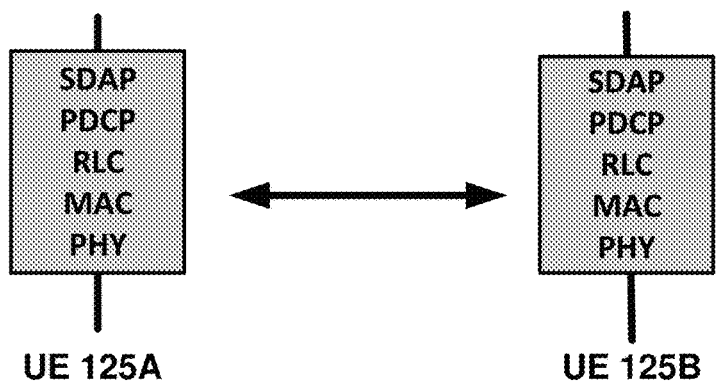
FIG. 5A, FIG. 5B, FIG. 5C and FIG. 5D show examples of radio protocol stacks for NR sidelink communication according to some aspects of some of various exemplary embodiments of the present disclosure.
Figure 5B:
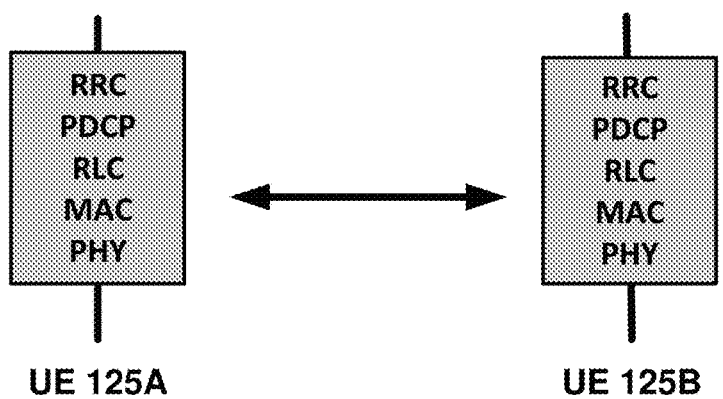
Figure 5C:
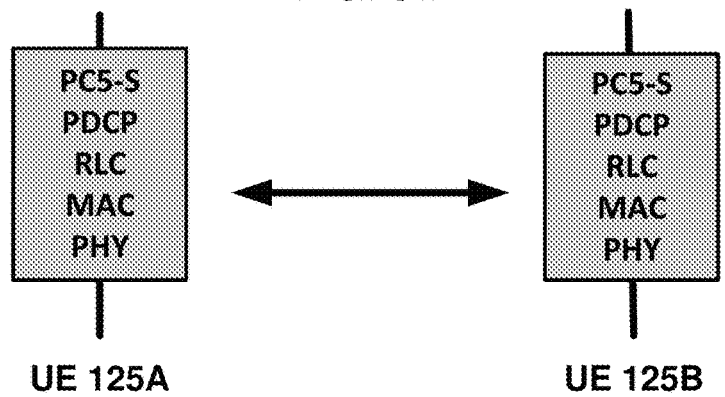
Figure 5D:
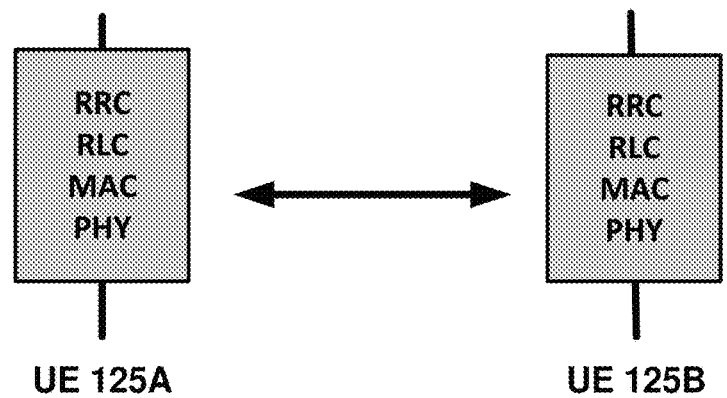

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
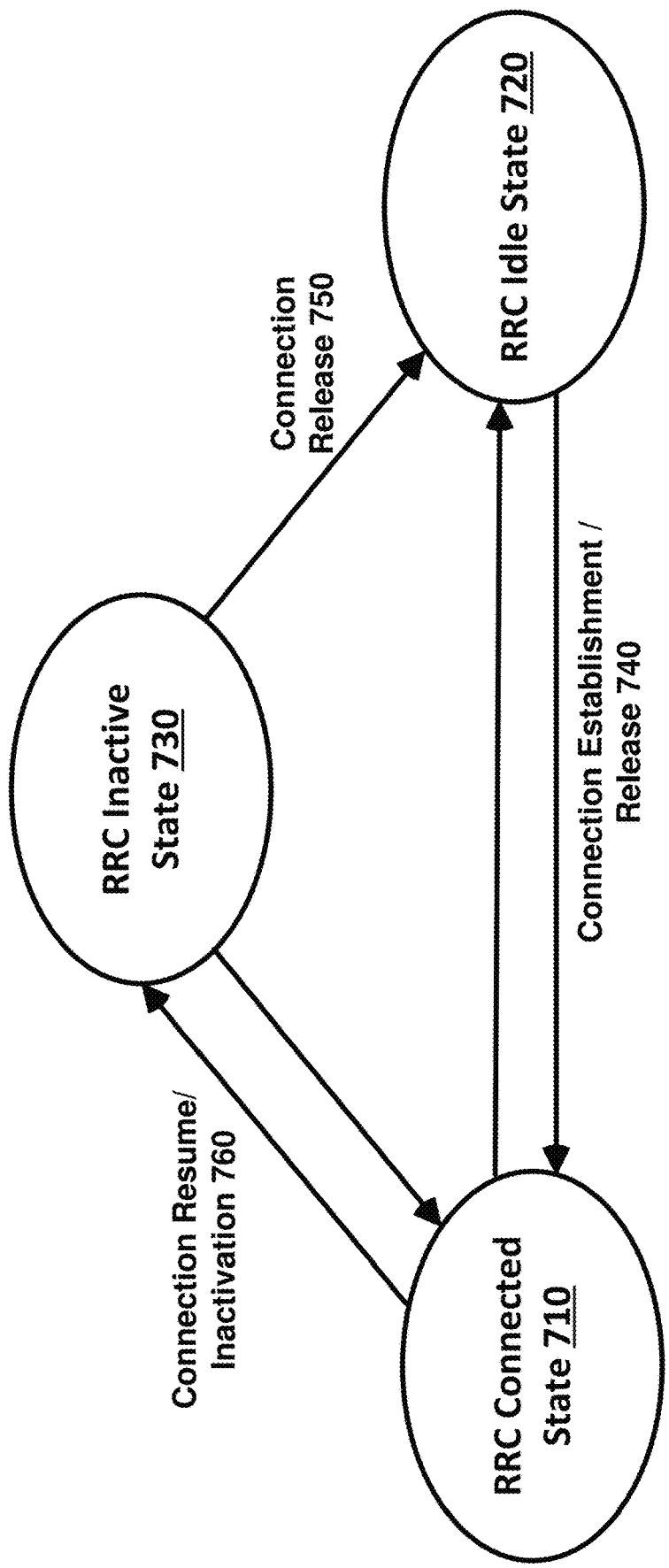
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
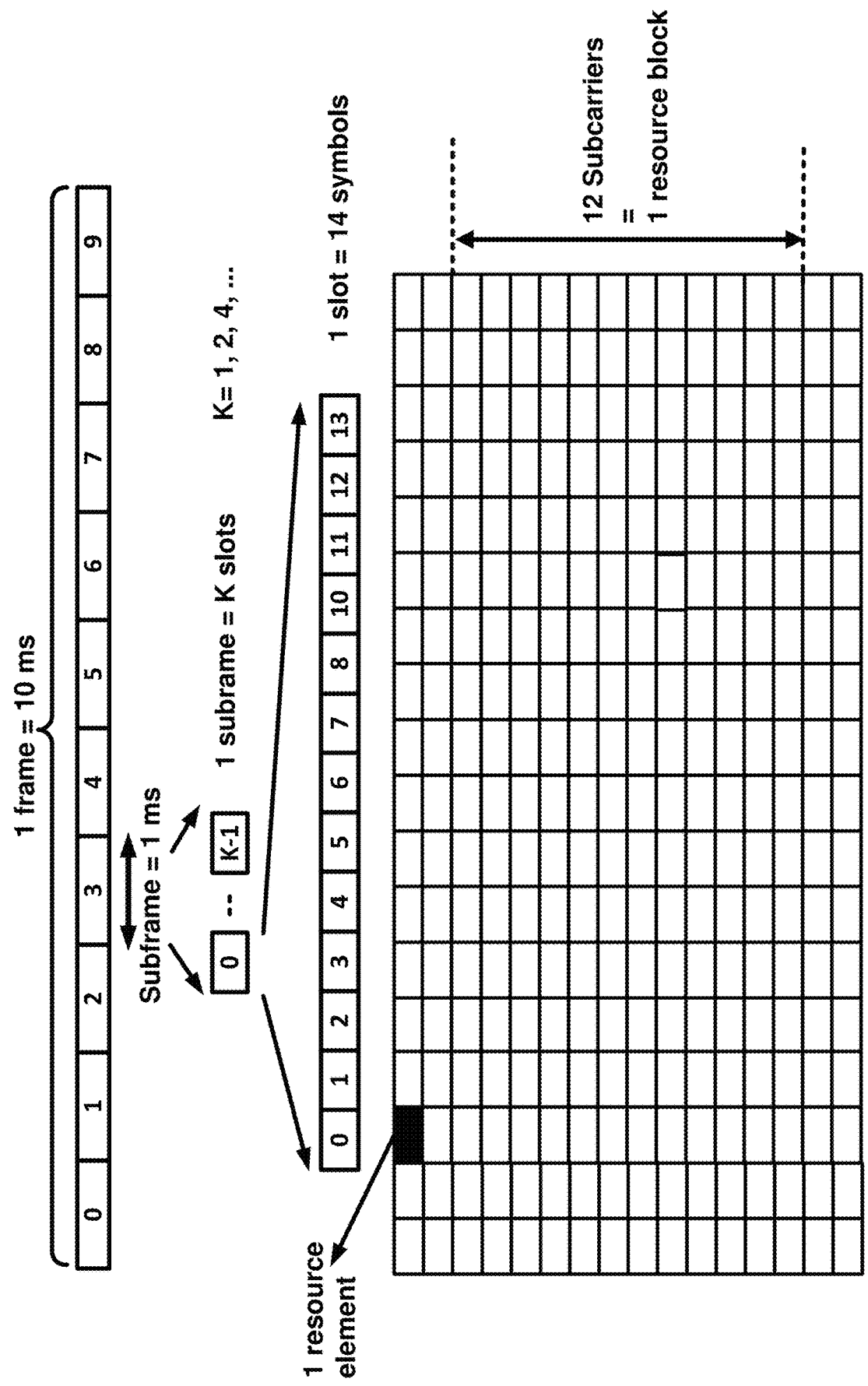
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
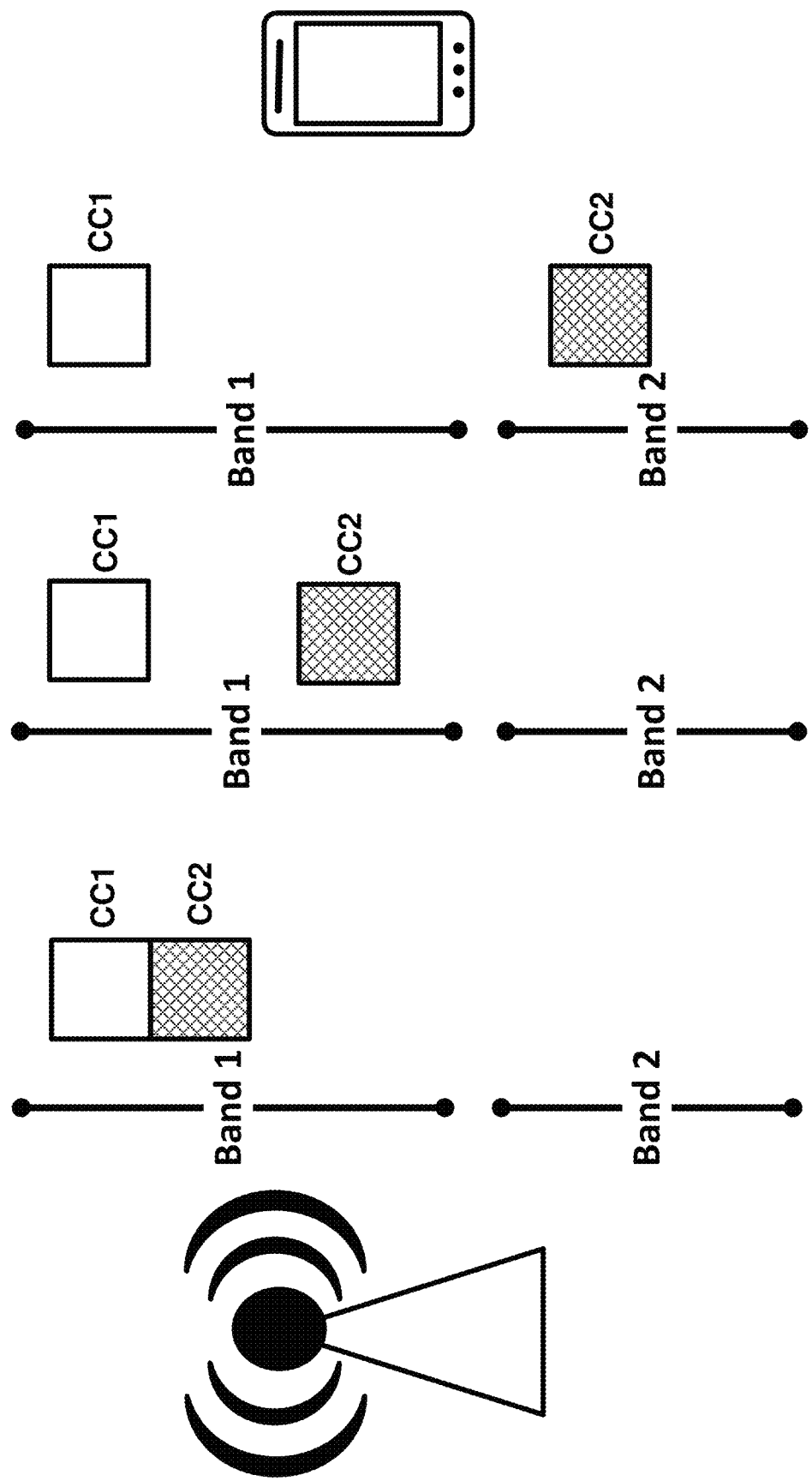
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
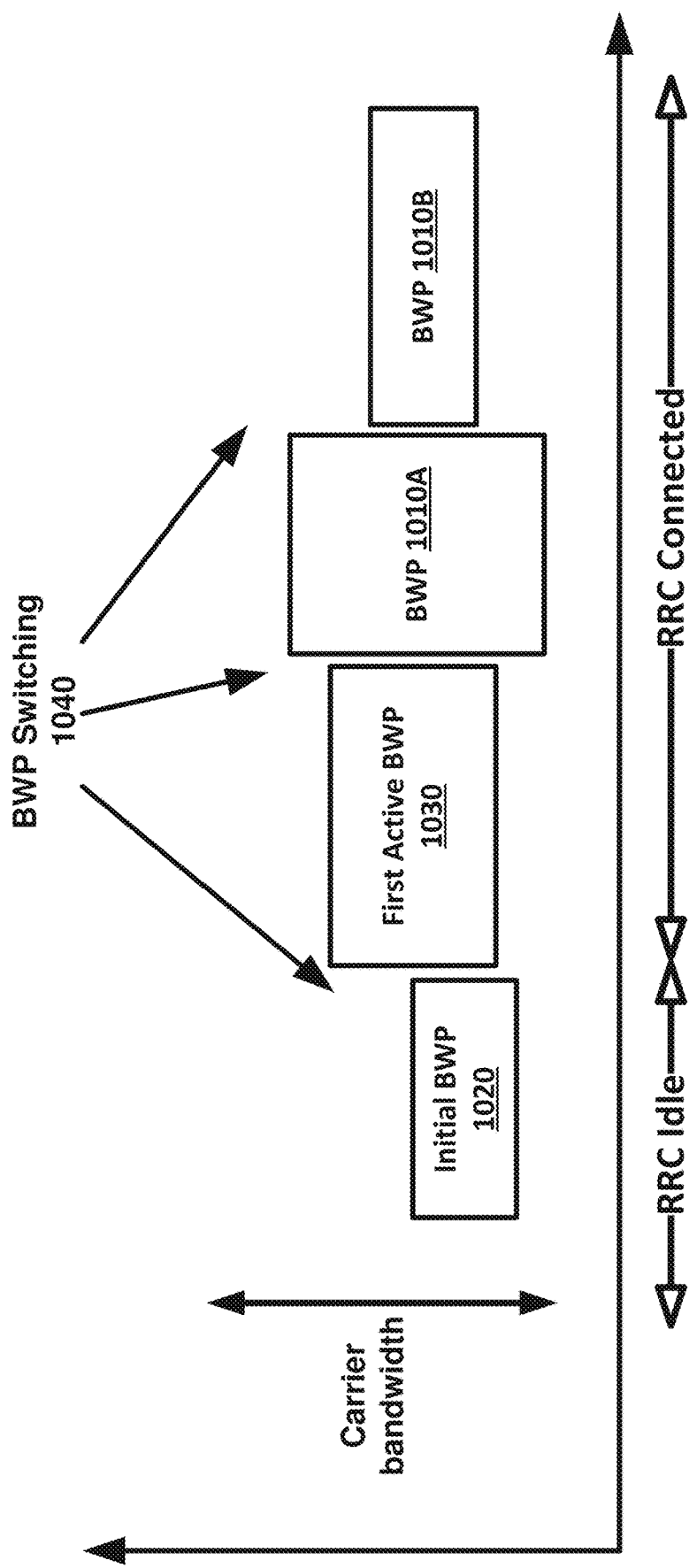
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-) configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
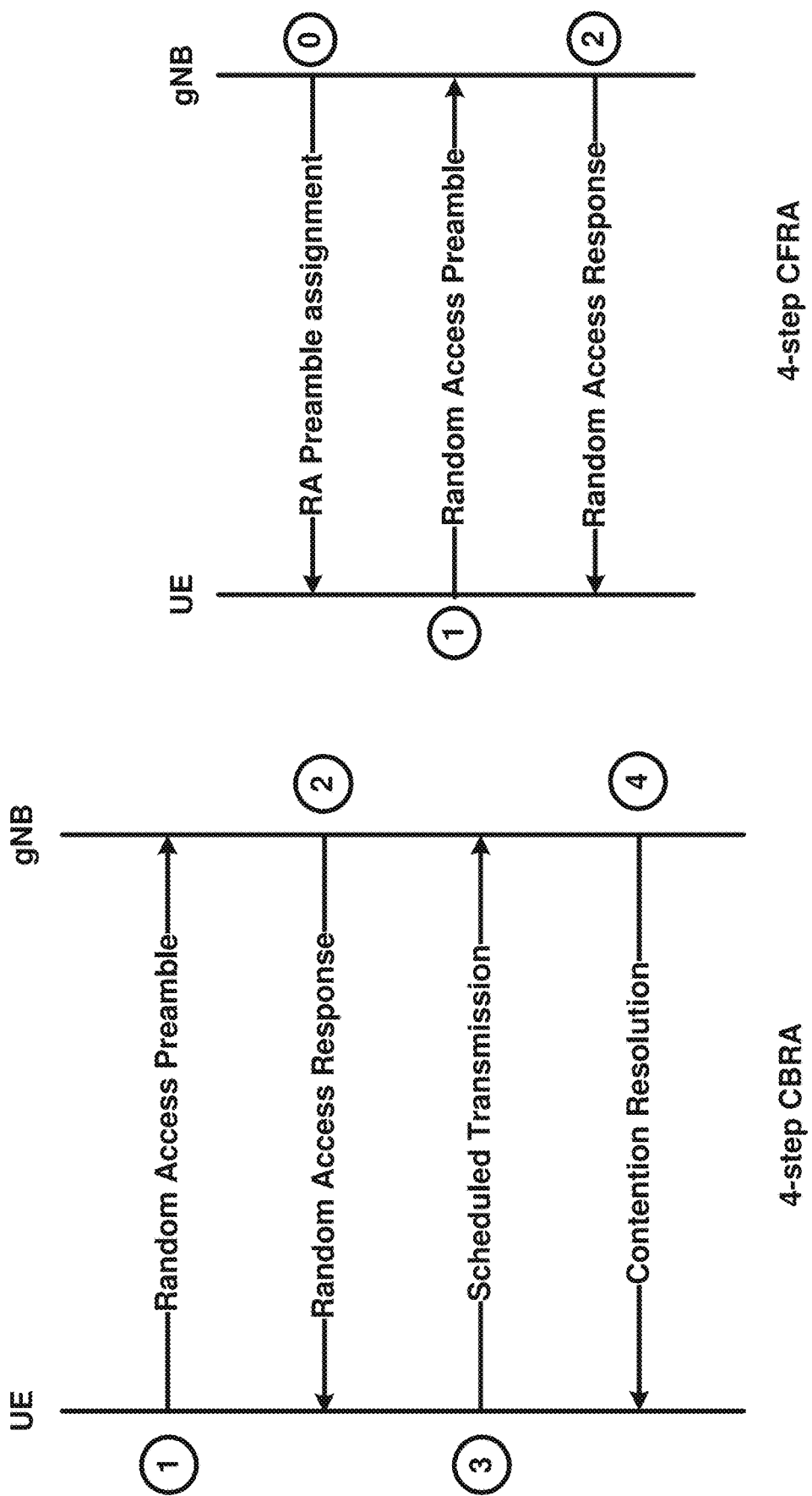
FIG. 11 shows example four-step contention-based and contention-free random access processes according to some aspects of some of various exemplary embodiments of the present disclosure.
Figure 12:
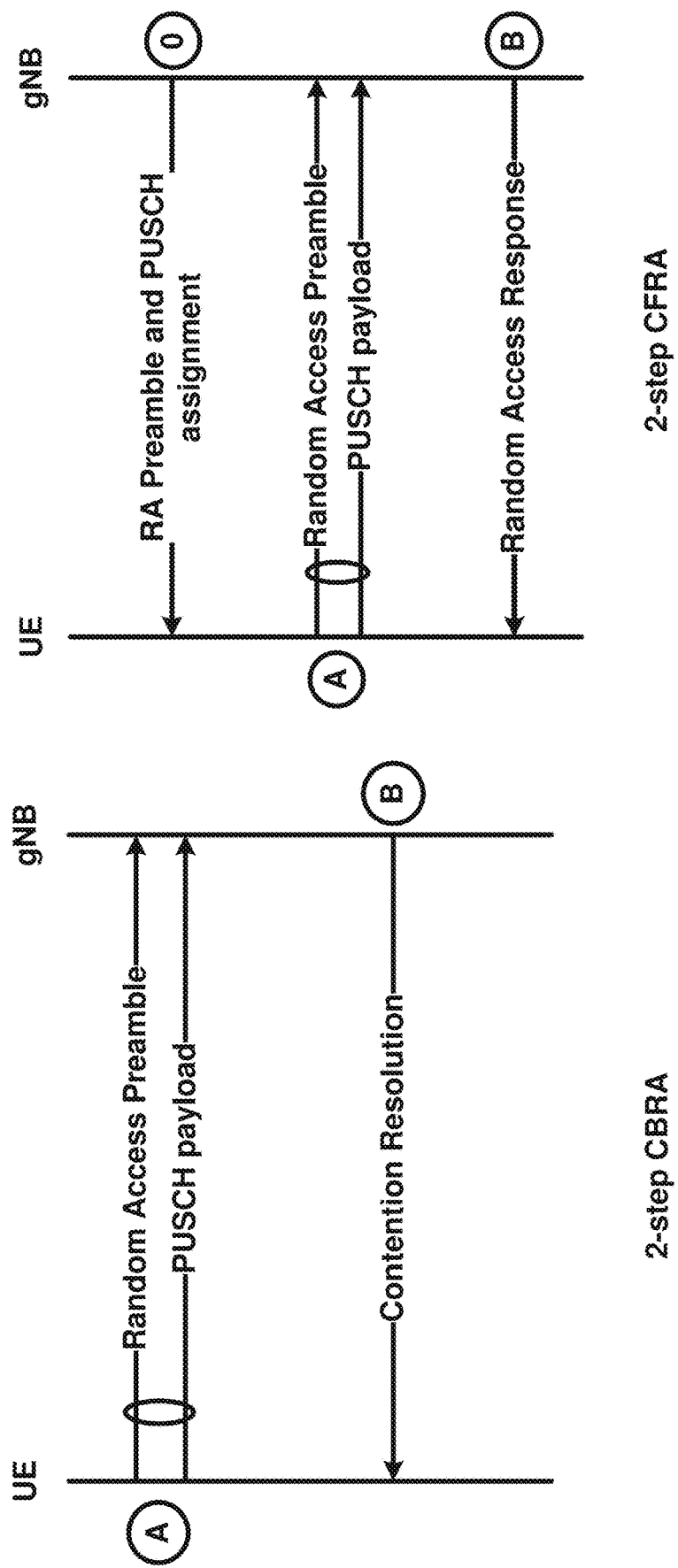
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
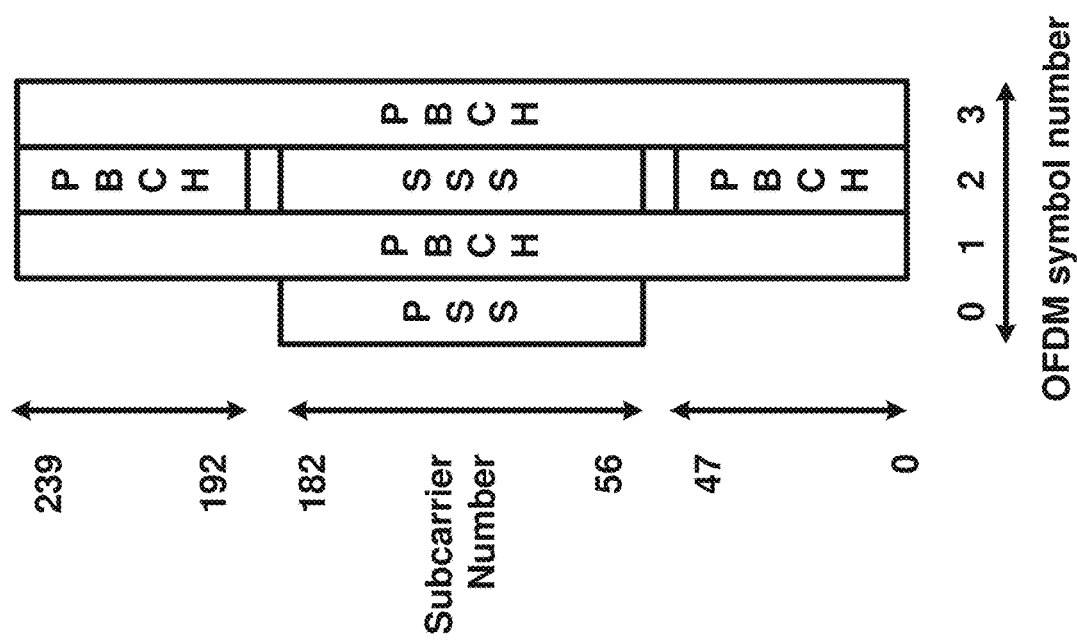
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBS) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
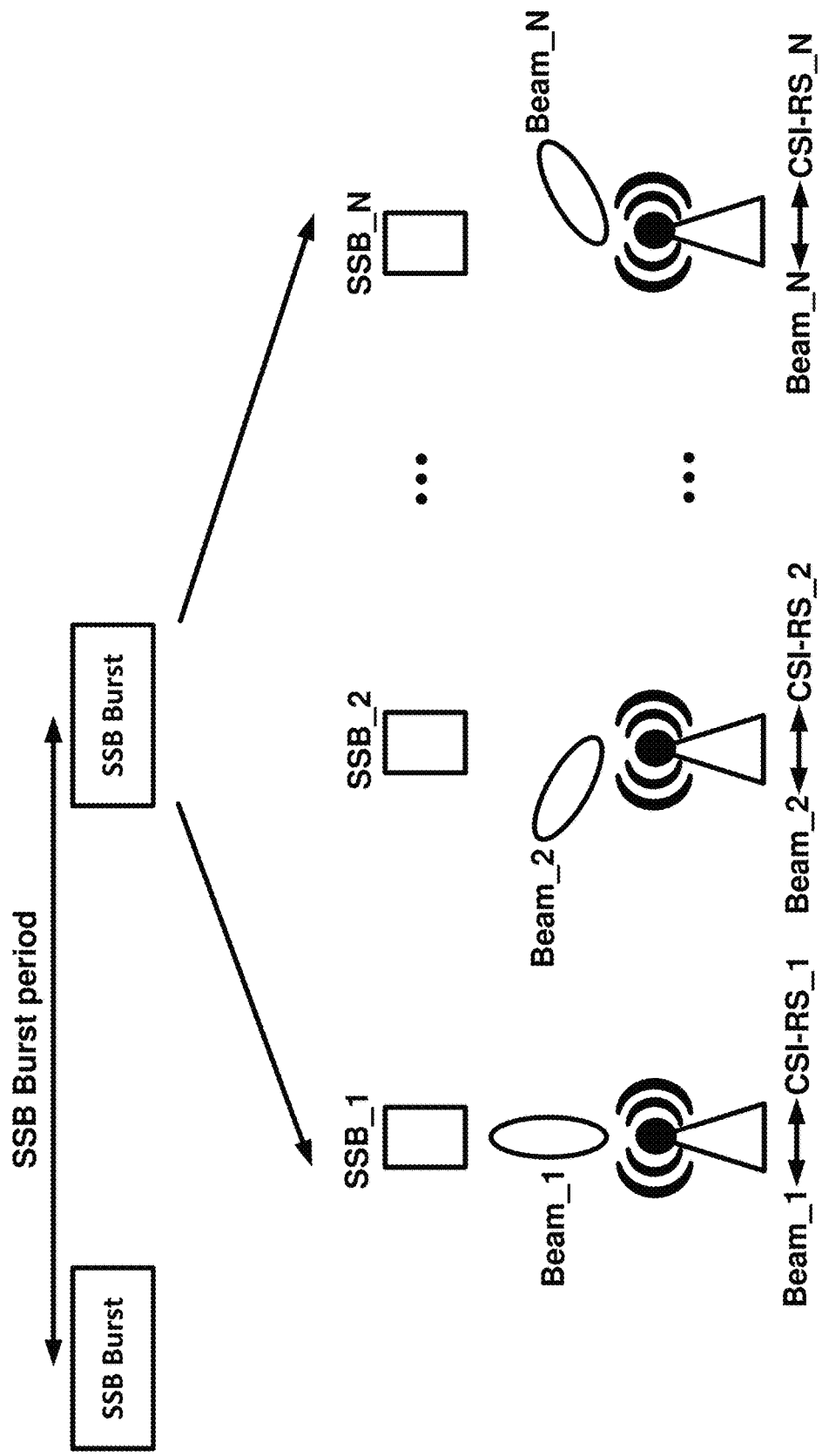
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
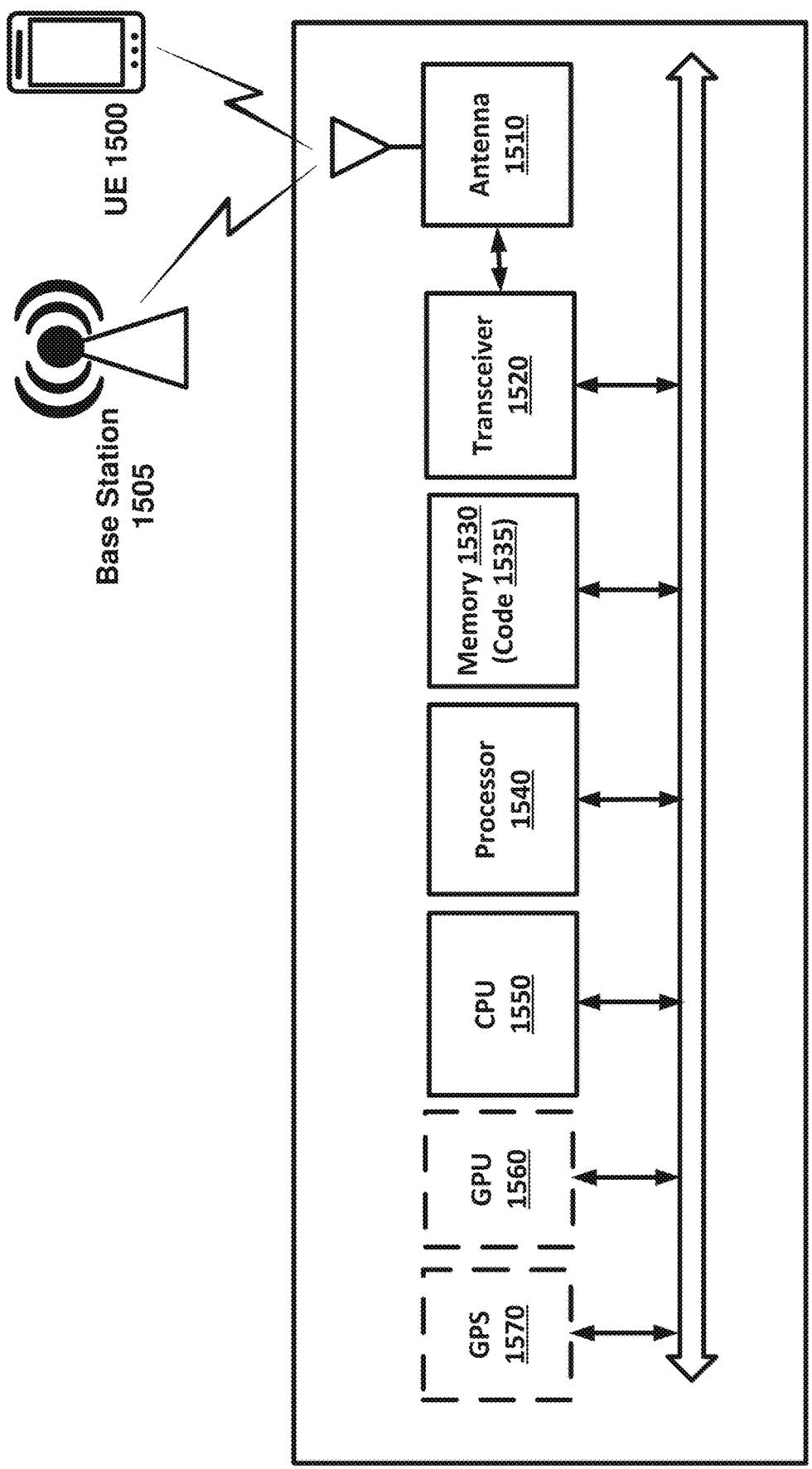
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. In one embodiment, the illustrative components of FIG. 15 may be considered to be illustrative of functional blocks of an illustrative base station 1505. In another embodiment, the illustrative components of FIG. 15 may be considered to be illustrative of functional blocks of an illustrative user equipment 1500. Accordingly, the components illustrated in FIG. 15 are not necessarily limited to either a user equipment or base station.

Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming.

In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some example, MBS services may be enabled via single-cell transmission. MBS may be transmitted in the coverage of a single cell. One or more Multicast/Broadcast control channels (e.g., MCCHs) and one or more Multicast/Broadcast data channels (e.g., MTCHs) may be mapped on DL-SCH. The scheduling may be done by the gNB. The Multicast/Broadcast control channel and the Multicast/Broadcast data channel transmissions may be indicated by a logical channel specific RNTI on PDCCH. In some examples, a one-to-one mapping between a service identifier such as a temporary mobile group identifier (TMGI) and a RAN level identifier such as a group identifier (G-RNTI) may be used for the reception of the DL-SCH to which a Multicast/Broadcast data channel may be mapped. In some examples, a single transmission may be used for DL-SCH associated with the Multicast/Broadcast control channel and/or the Multicast/Broadcast data channel transmissions and HARQ or RLC retransmissions may not be used and/or an RLC Unacknowledged Mode (RLC UM) may be used. In other examples some feedback (e.g., HARQ feedback or RLC feedback) may be used for transmissions via Multicast/Broadcast control channel and/or Multicast/Broadcast data channels.

In some example, for Multicast/Broadcast data channel, the following scheduling information may be provided on Multicast/Broadcast control channel: a Multicast/Broadcast data channel scheduling cycle, a Multicast/Broadcast data channel on-duration (e.g., duration that the UE waits for, after waking up from DRX, to receive PDCCHs), a Multicast/Broadcast data channel inactivity timer (e.g., duration that the UE waits to successfully decode a PDCCH, from the last successful decoding of a PDCCH indicating the DL-SCH to which this Multicast/Broadcast data channel is mapped, failing which it re-enters DRX).

In some examples, one or more UE identities may be related to MBS transmissions. The one or more identities may comprise at least one of: one or more first RNTIs that identify transmissions of the Multicast/Broadcast control channel; one or more second RNTIs that identify transmissions of a Multicast/Broadcast data channels. The one or more first RNTIs that identify transmissions of the Multicast/Broadcast control channel may comprise a single cell RNTI (SC-RNTI, other names may be used). The one or more second RNTIs that identify transmissions of a Multicast/Broadcast data channels may comprise a G-RNTI (nG-RNTI or other names may be used).

In some examples, one or more logical channels may be related to MBS transmissions. The one or more logical channels may comprise a Multicast/Broadcast control channel. The Multicast/Broadcast control channel may be a point-to-multipoint downlink channel used for transmitting MBS control information from the network to the UE, for one or several Multicast/Broadcast data channel. This channel may be used by UEs that receive or are interested to receive MBS. The one or more logical channels may comprise a Multicast/Broadcast data channel. This channel may be a point-to-multipoint downlink channel for transmitting MBS traffic data from the network.

Figure 16:
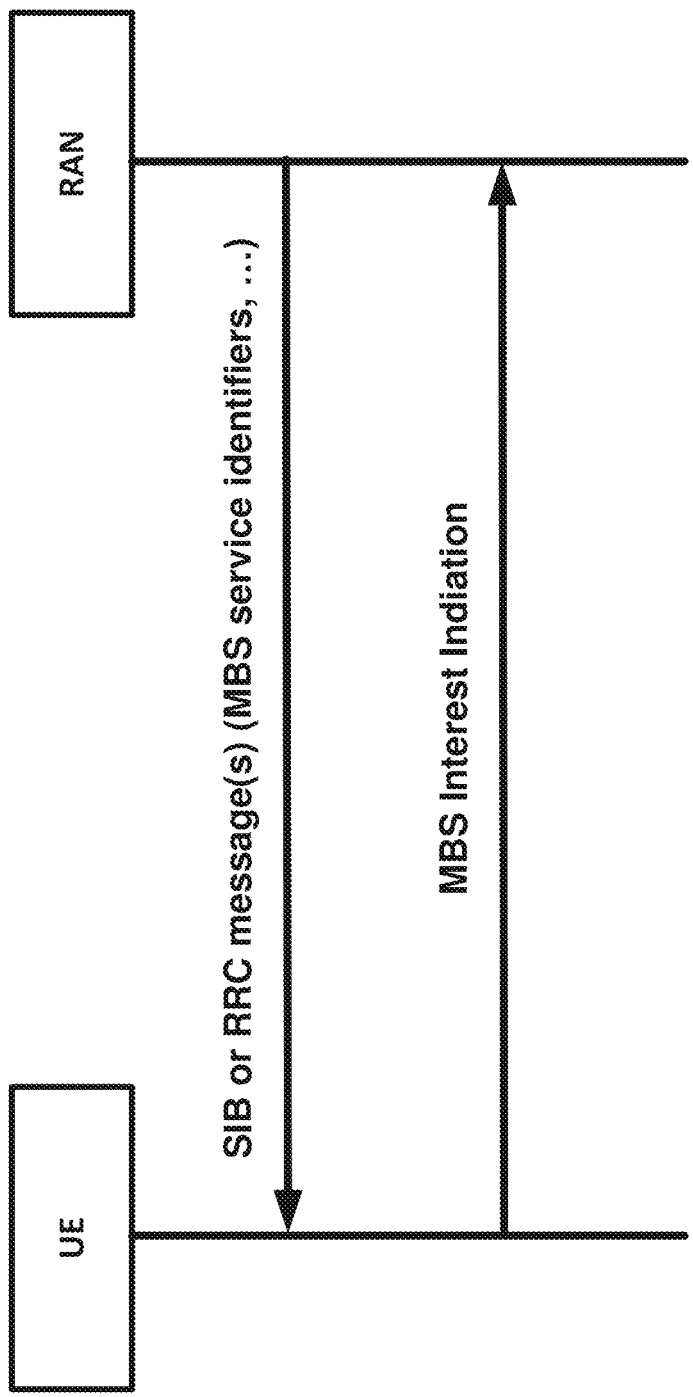
FIG. 16 shows an example multicast broadcast service (MBS) interest indication according to some aspects of some of various exemplary embodiments of the present disclosure.

In some examples, a procedure may be used by the UE to inform RAN that the UE is receiving or is interested to receive MBS service(s) via an MBS radio bearer, and if so, to inform the 5G RAN about the priority of MBS versus unicast reception or MBS service(s) reception in receive only mode. An example is shown in FIG. 16. The UE may transmit a message (e.g., an MBS interest indication message) message to inform RAN that the UE is receiving/interested to receive or no longer receiving/interested to receive MBS service(s). The UE may transmit the message based on receiving one or more messages (e.g., a SIB message or a unicast RRC message) from the network for example indicating one or more MBS Service Area Identifiers of the current and/or neighboring carrier frequencies.

In some examples, the UE may consider an MBS service to be part of the MBS services of interest if the UE is capable of receiving MBS services (e.g., via a single cell point to multipoint mechanism); and/or the UE is receiving or interested to receive this service via a bearer associated with MBS services; and/or one session of this service is ongoing or about to start; and/or at least one of the one or more MBS service identifiers indicated by network is of interest to the UE.

In some examples, control information for reception of MBS services may be provided on a specific logical channel: (e.g., a MCCH). The MCCH may carry one or more configuration messages which indicate the MBS sessions that are ongoing as well as the (corresponding) information on when each session may be scheduled, e.g., scheduling period, scheduling window and start offset. The one or more configuration messages may provide information about the neighbor cells transmitting the MBS sessions which may be ongoing on the current cell. In some examples, the UE may receive a single MBS service at a time, or more than one MBS services in parallel.

In some example, the MCCH information (e.g., the information transmitted in messages sent over the MCCH) may be transmitted periodically, using a configurable repetition period. The MCCH transmissions (and the associated radio resources and MCS) may be indicated on PDCCH.

In some examples, change of MCCH information may occur at specific radio frames/subframes/slots and/or a modification period may be used. For example, within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by a SIB or by RRC signaling.

In some examples, when the network changes (some of) the MCCH information, it may notify the UEs about the change in the first subframe/slot which may be used for MCCH transmission in a repetition period. Upon receiving a change notification, a UE interested to receive MBS services may acquire the new MCCH information starting from the same subframe/slot. The UE may apply the previously acquired MCCH information until the UE acquires the new MCCH information.

In an example, a system information block (SIB) may contain the information required to acquire the control information associated transmission of MBS. The information may comprise at least one of: one or more discontinuous reception (DRX) parameters for monitoring for scheduling information of the control information associated transmission of MBS, scheduling periodicity and offset for scheduling information of the control information associated transmission of MBS, modification period for modification of content of the control information associated transmission of MBS, repetition information for repetition of the control information associated transmission of MBS, etc.

In an example, an information element (IE) may provide configuration parameters indicating, for example, the list of ongoing MBS sessions transmitted via one or more bearers for each MBS session, one or more associated RNTIs (e.g., G-RNTI, other names may be used) and scheduling information. The configuration parameters may comprise at least one of: one or more timer values for discontinuous reception (DRX) (e.g., an inactivity timer or an On Duration timer), an RNTI for scrambling the scheduling and transmission of a Multicast/Broadcast traffic channel (e.g., MTCH, other names may be used), ongoing MBS session, one or more power control parameters, one or more scheduling periodicity and/or offset values for one or more MBS traffic channels, information about list of neighbor cells, etc.

In some examples a gNB or ng-eNB may comprise logical nodes that host some, all or parts of the user plane and/or control plane functionalities. For example, a gNB Central Unit (gNB-CU) may be a logical node hosting RRC, SDAP and PDCP protocols of the gNB or RRC and PDCP protocols of the en-gNB that controls the operation of one or more gNB-DUs. The gNB-CU may terminate the F1 interface connected with the gNB-DU. A gNB Distributed Unit (gNB-DU) may be a logical node hosting RLC, MAC and PHY layers of the gNB or en-gNB, and its operation may be partly controlled by gNB-CU. One gNB-DU may support one or multiple cells. One cell may be supported by only one gNB-DU. The gNB-DU may terminate the F1 interface connected with the gNB-CU. A gNB-CU-Control Plane (gNB-CU-CP) may be a logical node hosting the RRC and the control plane part of the PDCP protocol of the gNB-CU for an en-gNB or a gNB. The gNB-CU-CP may terminate the E1 interface connected with the gNB-CU-UP and the F1-C interface connected with the gNB-DU. A gNB-CU-User Plane (gNB-CU-UP) may be a logical node hosting the user plane part of the PDCP protocol of the gNB-CU for an en-gNB, and the user plane part of the PDCP protocol and the SDAP protocol of the gNB-CU for a gNB. The gNB-CU-UP may terminate the E1 interface connected with the gNB-CU-CP and the F1-U interface connected with the gNB-DU.

Figure 17:
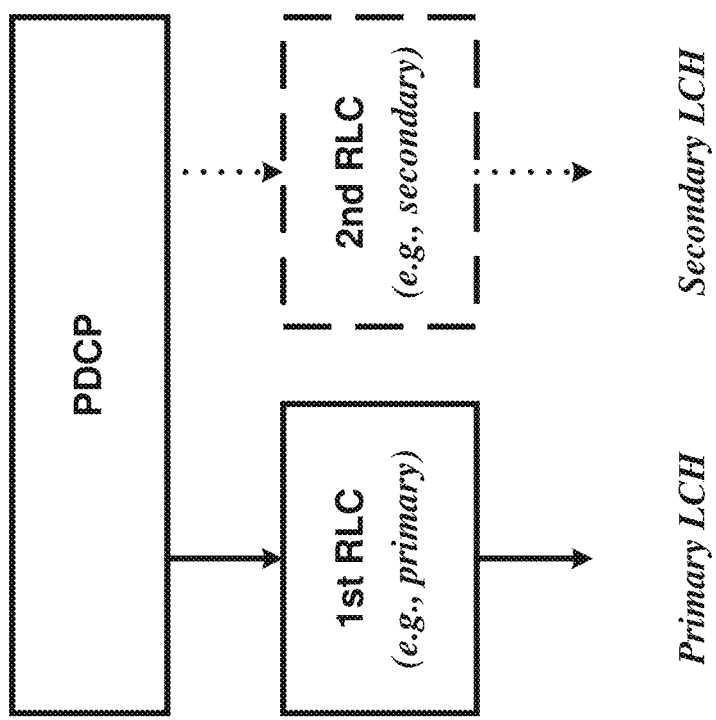
FIG. 17 shows an example packet data convergence protocol (PDCP) duplication process according to some aspects of some of various exemplary embodiments of the present disclosure.

In some examples, duplication may be configured for a radio bearer by RRC, at least one secondary RLC entity is added to the radio bearer to handle the duplicated PDCP PDUs as shown in FIG. 17, where the logical channel corresponding to the first RLC entity may be referred to as the primary logical channel, and the logical channel corresponding to the secondary RLC entity(ies), the secondary logical channel(s). In some examples, all RLC entities may have the same RLC mode. Duplication at PDCP may comprise submitting the same PDCP PDUs multiple times: once to each activated RLC entity for the radio bearer. In some examples, PDCP packet duplication may be used to enhance reliability. With multiple independent transmission paths, packet duplication may increase reliability and reduces latency.

In some examples, when configuring duplication for a radio bearer (e.g., DRB, multicast radio bearer (MRB), etc.), RRC may set the state of PDCP duplication (either activated or deactivated) at the time of (re-)configuration. After the configuration, the PDCP duplication state may be dynamically controlled by means of a MAC control element and in dual connectivity (DC), the UE may apply the MAC CE commands regardless of their origin (e.g., master cell group (MCG) or secondary cell group (SCG)). In some examples, when duplication is configured for an SRB, the state may be active and may not be dynamically controlled. In some examples, when configuring duplication for a radio bearer (e.g., DRB, MRB, etc.) with more than one secondary RLC entity, RRC also may set the state of each of them (e.g., either activated or deactivated). Subsequently, a MAC CE may be used to dynamically control whether each of the configured secondary RLC entities for a DRB may be activated or deactivated, e.g., which of the RLC entities may be used for duplicate transmission. Primary RLC entity may not be deactivated. In some examples, when duplication is deactivated for a radio bearer (e.g., DRB, MRB, etc.), all secondary RLC entities associated to this DRB may be deactivated. In some examples, when a secondary RLC entity is deactivated, it is not re-established, the HARQ buffers may not be flushed, and the transmitting PDCP entity may indicate to the secondary RLC entity to discard duplicated PDCP PDUs.

In some examples, when activating duplication for a radio bearer (e.g., DRB, MRB, etc.), RAN may ensure that at least one serving cell is activated for each logical channel of the radio bearer; and when the deactivation of SCells leaves no serving cells activated for a logical channel of the DRB, the RAN may ensure that duplication is also deactivated.

In some examples, when duplication is activated, the original PDCP PDU and the corresponding duplicate(s) may not be transmitted on the same carrier. The primary and secondary logical channels may either belong to the same MAC entity (e.g., referred to as CA duplication) or to different ones (e.g., referred to as DC or DC+CA duplication). CA duplication may be configured together with DC duplication when duplication over more than two legs is configured in the UE. In CA duplication, logical channel mapping restrictions may be used in MAC to ensure that the primary and secondary logical channels are not sent on the same carrier. In some examples, when CA duplication is configured for an SRB, one of the logical channels associated to the SRB may be mapped to SpCell.

In some examples, when CA duplication is deactivated for a radio bearer (e.g., DRB, MRB, etc.), the logical channel mapping restrictions of the primary and secondary logical channels may be lifted for as long as duplication remains deactivated.

In some examples, when an RLC entity acknowledges the transmission of a PDCP PDU, the PDCP entity may indicate to the other RLC entity(ies) to discard it. In addition, in case of CA duplication, when an RLC entity restricted to only SCell(s) reaches the maximum number of retransmissions for a PDCP PDU, the UE may inform the gNB and may not trigger radio link failure (RLF).

In some examples, if one or more radio bearers (e.g., DRBs, MRB(s), etc.) are configured with PDCP duplication, the network may activate and deactivate the PDCP duplication for all or a subset of associated RLC entities for the configured bearer(s).

In some examples, the PDCP duplication for the configured bearer(s) (e.g., DRB(s). MRB(s), etc.) may be activated and deactivated by: receiving the Duplication Activation/Deactivation MAC CE; receiving the Duplication RLC Activation/Deactivation MAC CE; or indication by RRC.

In some examples, the PDCP duplication for all or a subset of associated RLC entities for the configured bearer(s) (e.g., DRB(s), MRB(s), etc.) may be activated and deactivated by: receiving the Duplication RLC Activation/Deactivation MAC CE; or indication by RRC.

In some examples, if a Duplication Activation/Deactivation MAC CE is received activating the PDCP duplication of a radio bearer (e.g., DRB, MRB, etc.): the MAC entity may, for each radio bearer configured with PDCP duplication, indicate the activation of PDCP duplication of the DRB to upper layers.

In some examples, if a Duplication Activation/Deactivation MAC CE is received deactivating the PDCP duplication of the radio bearer: the MAC entity may, for each radio bearer configured with PDCP duplication, indicate the deactivation of PDCP duplication of the DRB to upper layers.

In some examples, if a Duplication RLC Activation/Deactivation MAC CE is received activating PDCP duplication for associated RLC entities of a radio bearer (e.g. DRB, MRB, etc.) configured with PDCP duplication: the MAC entity may, for each radio bearer configured with PDCP duplication, indicate the activation of PDCP duplication for the indicated secondary RLC entity(ies) of the radio bearer to upper layers.

In some examples, if a Duplication RLC Activation/Deactivation MAC CE is received deactivating PDCP duplication for associated RLC entities of a radio bearer configured with PDCP duplication: the MAC entity may, for each radio bearer configured with PDCP duplication, indicate the deactivation of PDCP duplication for the indicated secondary RLC entity(ies) of the DRB to upper layers.

Figure 18:
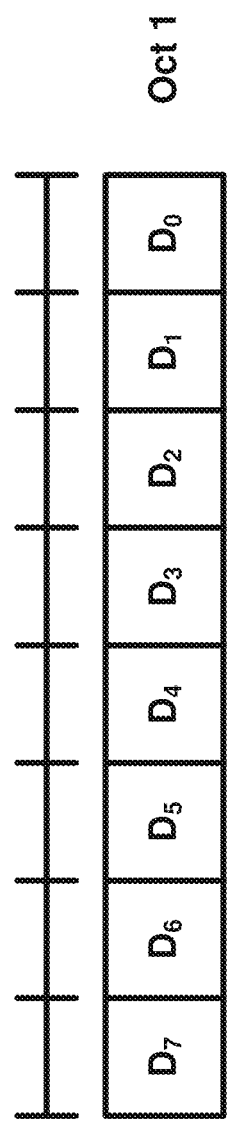
FIG. 18 shows an example PDCP duplication activation/deactivation signaling according to some aspects of some of various exemplary embodiments of the present disclosure.

In some examples as shown in FIG. 18, the Duplication Activation/Deactivation MAC CE of one octet may be used and may be identified by a MAC subheader with a corresponding logical channel identifier (LCID). The MAC CE may have a fixed size and may comprise of a single octet containing eight D-fields. The Di field may indicate the activation/deactivation status of the PDCP duplication of radio bearer i (e.g., DRB i or MRB i) where i may be the ascending order of the DRB ID among the DRBs configured with PDCP duplication and with RLC entity(ies) associated with this MAC entity. The Di field may be set to 1 to indicate that the PDCP duplication of DRB i may be activated. The Di field may be set to 0 to indicate that the PDCP duplication of DRB i may be deactivated.

Figure 19:
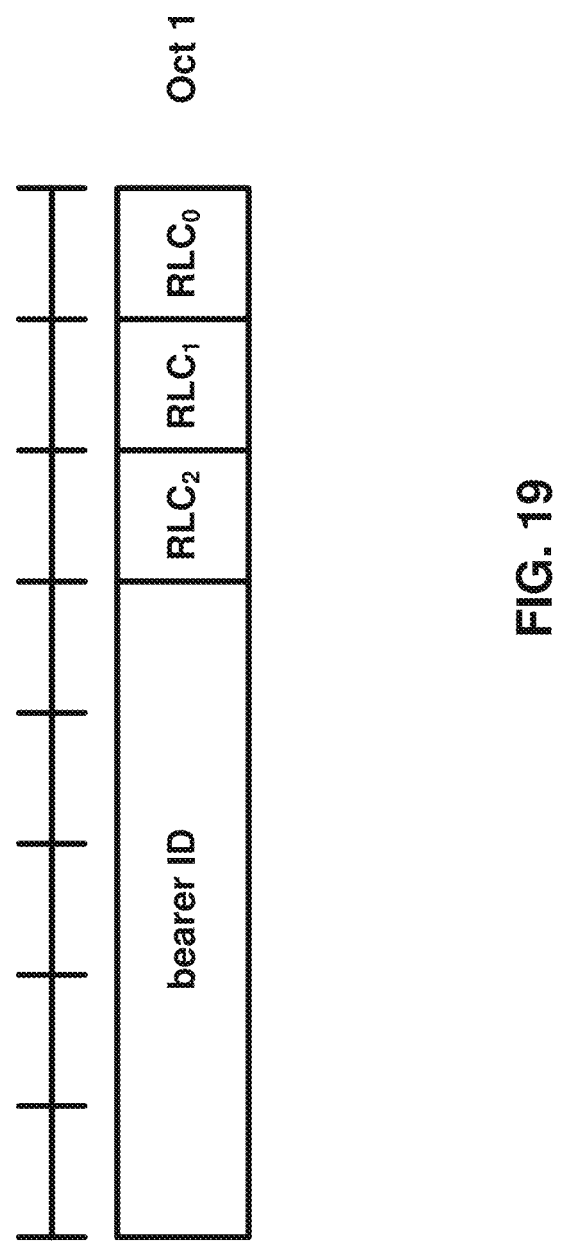
FIG. 19 shows an example PDCP duplication activation/deactivation signaling according to some aspects of some of various exemplary embodiments of the present disclosure.

In some examples, the Duplication RLC Activation/De-activation MAC CE may be identified by a MAC subheader with a corresponding logical channel identifier. The MAC CE mah have a fixed size and may comprise of a single octet as shown in FIG. 19. The bearer ID field may indicates the identity of bearer (e.g., DRB, MRB, etc.) for which the MAC CE applies. The RLCi field may indicate the activation/deactivation status of PDCP duplication for the RLC entity i where i may be ascending order of logical channel ID of secondary RLC entities in the order of MCG and SCG, for the radio bearer. The RLCi field may be set to 1 to indicate that the PDCP duplication for the RLC entity i may be activated. The RLCi field may be set to 0 to indicate that the PDCP duplication for the RLC entity i may be deactivated.

The PDCP sequence number (SN) may have a length of 12, or 18 bits The length of the PDCP SN may be configured by upper layers (e.g., via a pdcp-SN-SizeUL, pdcp-SN-SizeDL, or sl-PDCP-SN-Size information element).

In an example, a COUNT parameter may have a length of 32 bits may the count value may be composed of a HFN and the PDCP SN. The size of the HFN part in bits may be equal to 32 minus the length of the PDCP SN.

In some examples, when upper layers request a PDCP entity re-establishment, for acknowledged mode (AM) radio bearers (e.g., DRBs, MRBs, etc.) which were not suspended, from the first PDCP SDU for which the successful delivery of the corresponding PDCP Data PDU has not been confirmed by lower layers, a transmitting PDCP entity may perform retransmission or transmission of all the PDCP SDUs already associated with PDCP SNs in ascending order of the COUNT values associated to the PDCP SDU prior to the PDCP entity re-establishment. The transmitting PDCP entity may perform header compression of the PDCP SDU using ROHC, perform integrity protection and ciphering of the PDCP SDU using the COUNT value associated with this PDCP SDU and submit the resulting PDCP Data PDU to lower layer.

In some examples, For AM DRBs, when upper layers request a PDCP data recovery for a radio bearer, the transmitting PDCP entity may: perform retransmission of all the PDCP Data PDUs previously submitted to re-established or released AM RLC entities in ascending order of the associated COUNT values for which the successful delivery has not been confirmed by lower layers.

In some examples, for radio bearers (e.g., for DAPS bearers), when upper layers request uplink data switching, for AM DRBs, from the first PDCP SDU for which the successful delivery of the corresponding PDCP Data PDU has not been confirmed by the RLC entity associated with the source cell, the transmitting PDCP entity may perform retransmission or transmission of all the PDCP SDUs already associated with PDCP SNs in ascending order of the COUNT values associated to the PDCP SDU prior to uplink data switching to the RLC entity associated with the target cell. The transmitting PDCP entity may perform header compression of the PDCP SDU using ROHC; perform integrity protection and ciphering of the PDCP SDU using the COUNT value associated with this PDCP SDU; submit the resulting PDCP Data PDU to lower layer.

Figure 20:
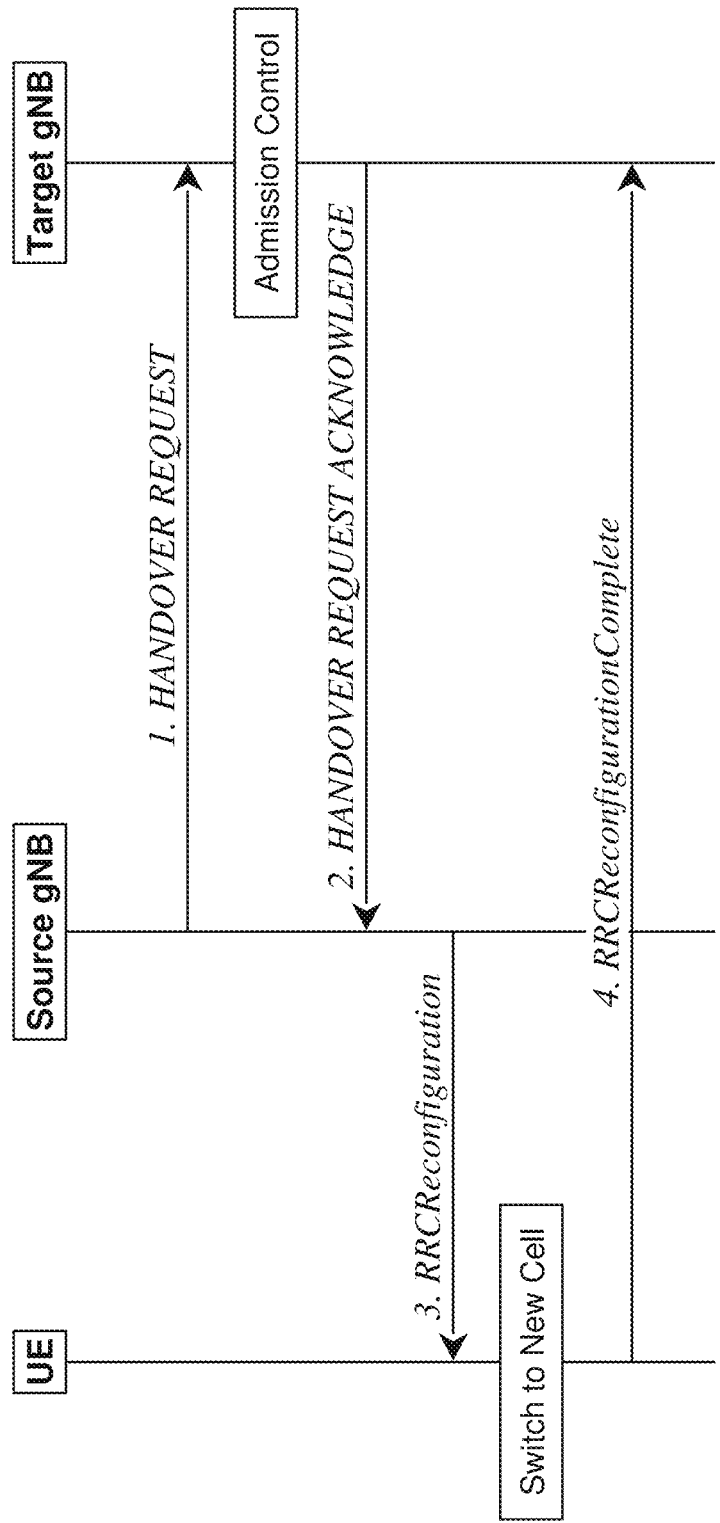
FIG. 20 shows an example handover process according to some aspects of some of various exemplary embodiments of the present disclosure.

In some examples, network controlled mobility may apply to UEs in RRC_CONNECTED and may be categorized into two types of mobility: cell level mobility and beam level mobility. The cell Level Mobility may require explicit RRC signaling to be triggered, i.e. handover. For inter-gNB handover, the signaling procedures consist of at least the following elemental components as shown in FIG. 20: The source gNB may initiate handover and issues a HANDOVER REQUEST over the Xn interface. The target gNB may perform admission control and provides the new RRC configuration as part of the HANDOVER REQUEST ACKNOWLEDGE. The source gNB may provide the RRC configuration to the UE by forwarding the RRCReconfiguration message received in the HANDOVER REQUEST ACKNOWLEDGE. The RRCReconfiguration message may include at least cell ID and information required to access the target cell so that the UE may access the target cell without reading system information. For some cases, the information required for contention-based and contention-free random access may be included in the RRCReconfiguration message. The access information to the target cell may include beam specific information, if any. The UE may move the RRC connection to the target gNB and may reply with the RRCReconfigurationComplete.

In some examples, in case of dual active protocol stack (DAPS) handover, the UE may continue the downlink user data reception from the source gNB until releasing the source cell and may continue the uplink user data transmission to the source gNB until successful random access procedure to the target gNB.

In some examples, the handover mechanism triggered by RRC may require the UE at least to reset the MAC entity and re-establish RLC, except for DAPS, where upon reception of the handover command, the UE may: create a MAC entity for target; establishes the RLC entity and an associated DTCH logical channel for target for each DRB configured with DAPS; for the DRB configured with DAPS, reconfigure the PDCP entity with separate security and ROHC functions for source and target and may associate them with the RLC entities configured by source and target respectively; and retain the rest of the source configurations until release of the source.

In some examples, RRC managed handovers with and without PDCP entity re-establishment may both be supported. For radio bearers (e.g., DRBs, MRBs, etc.) using RLC AM mode, PDCP may either be re-established together with a security key change or may initiate a data recovery procedure without a key change. In some examples, for DRBs or MRBs using RLC UM mode and for SRBs, PDCP may either be re-established together with a security key change or may remain as it is without a key change.

In some examples, Beam Level Mobility may not require explicit RRC signaling to be triggered. The gNB may provide, via RRC signaling, the UE with measurement configuration containing configurations of SSB/CSI resources and resource sets, may report and trigger states for triggering channel and interference measurements and reports. Beam Level Mobility may be dealt with at lower layers by means of physical layer and MAC layer control signaling, and RRC may not be required to know which beam is being used at a given point in time.

In some examples, for RLC-AM bearers: for in-sequence delivery and duplication avoidance, PDCP SN may be maintained on a per radio bearer (e.g., DRB, MRB) basis and the source gNB may inform the target gNB about the next DL PDCP SN to allocate to a packet which may not have a PDCP sequence number yet (either from source gNB or from the UPF). In both the UE and the target gNB, a window-based mechanism may be used for duplication detection and reordering. The occurrence of duplicates over the air interface in the target gNB may be minimized by means of PDCP SN based reporting at the target gNB by the UE. In uplink, the reporting may be optionally configured on a per radio bearer (DRB, MRB, etc.) basis by the gNB and the UE may first start by transmitting those reports when granted resources are in the target gNB. The target gNB may re-transmit and prioritizes downlink data forwarded by the source gNB (e.g., the target gNB may first send forwarded PDCP SDUs with PDCP SNs, then forwarded downlink PDCP SDUs without SNs before sending new data from 5GC), excluding PDCP SDUs for which the reception was acknowledged through PDCP SN based reporting by the UE. In some example, the UE may re-transmit in the target gNB all uplink PDCP SDUs starting from the oldest PDCP SDU that has not been acknowledged at RLC in the source, excluding PDCP SDUs for which the reception was acknowledged through PDCP SN based reporting by the target.

In some examples, an IE PDCP-Config may be used to set the configurable PDCP parameters for signaling and data radio bearers.

In some examples, the IE RLC-BearerConfig may be used to configure an RLC entity, a corresponding logical channel in MAC and the linking to a PDCP entity (served radio bearer). A parameter logicalChannelIdentity may indicate ID used commonly for the MAC logical channel and for the RLC bearer. A parameter reestablishRLC may indicate that RLC may be re-established. Network may set this to true at least whenever the security key used for the radio bearer associated with this RLC entity changes. For SRB2 and DRBs, it may be set to true during the resumption of the RRC connection or the first reconfiguration after reestablishment. A parameter rlc-Config may indicate the RLC mode (UM, AM) and may provide corresponding parameters. RLC mode reconfiguration may be performed by radio bearer (e.g., DRB) release/addition or full configuration. A parameter servedRadioBearermay associate the RLC bearer with an SRB, a DRB or an MRB. The UE may deliver DL RLC SDUs received via the RLC entity of this RLC bearer to the PDCP entity of the servedRadioBearer. The UE may advertise and deliver uplink PDCP PDUs of the uplink PDCP entity of the servedRadioBearer to the uplink RLC entity of this RLC bearer unless the uplink scheduling restrictions (moreThanOneRLC in PDCP-Config and the restrictions in LogicalChannelConfig) forbid it to do so.

In an example, the IE RLC-Config may be used to specify the RLC configuration of SRBs and DRBs.

In some examples, a UE and/or network may use mechanisms to enable multicast and broadcast transmission of data within a cell and across multiple cells assuming no reliance on large area single frequency networks (SFN). In some examples, the mechanisms may be based on Single Cell point to multipoint (PTM) framework. Example embodiments enable configuration of multicast/broadcast bearers and their service continuities and reliable deliveries by enhancements to the packet data convergence protocol (PDCP) sub-layer of layer 2.

In existing solutions for multicast broadcast services (MBS), the MBS data may be transmitted without layer 2 encryption and header compression and the PDCP packet retransmission or forwarding may not be used. In some examples, due to diversity of traffic types, applications and use cases, the encryption and/or header compression may be used. In some examples, the packet duplication and retransmission of missing packets, which may be part of PDCP function, may be used for MBS transmissions. At least some of the PDCP functions may be used for MBS. Existing PDCP solutions may not consider CU-DU architecture and packet duplication operation in PDCP design. Example embodiments enhance the PDCP functionalities in connection with the MBS services.

In some examples, the configuration of PDCP for multicast and broadcast services may take into account the possibility of no feedback or multiple feedback channels for the same PDCP transmission. In some examples, a single PDCP instantiation for MBS may be configured and associated with multiple RLC channels toward a distributed unit (DU) or a UE within a DU. In some examples, the packet duplication functionality of PDCP may be used differently in MBS and unicast radio bearers (e.g., MRBs and DRBs, respectively). In some examples, different set of PDCP functions for different MBS services (e.g., corresponding to different Multicast Radio Bearers (MRBs)) may be supported/configured. For example, different MBS services may have different requirements (e.g., different services continuity requirements). The use of PDCP functions and their configuration for MRBs may be different from those used for DRB and may also be different across different MRBs.

In some examples, from PDCP perspective, a common set of parameters such as Sequence Number, encryption, header compression may be applied for all MBS data for a given MRB. In some examples, to avoid too many similar PDCP configurations, a common PDCP may be configured and used for each MRB. A common PDCP may be configured for UEs receiving MBS for the same MRB.

In some examples, the same common MBS PDCP entity may be reused for unicast transmission when changing from multicast to unicast for delivering an MBS service. In an example, or a new PDCP entity may be configured when changing from multicast to unicast for delivering an MBS service. In some examples, the higher layer attributes of MBR may be maintained regardless of unicast or multicast delivery at lower layers and the same PDCP instance may be reused when transmission is switched from multicast to unicast. In some examples, when MBS transmission from gNB is switched from multicast to unicast, the same PDCP instance and configuration may be reused.

In some examples, the MBS data may be transmitted from multiple nodes within a RAN, for example from multiple DUs within a gNB or multiple remote unites (RUs)/transmission reception points (TRPs). In some examples, while the configuration of MRB and its higher layer attributes may be configured at the CU both in terms of user plane and control plane, the mode of MBS transmission control, e.g., multicast vs unicast, and timing of scheduling may be controlled by the MAC at each DU. In some examples, higher layer attributes and configurations of MRB at user and control plane may be set by CU while flexible scheduling of MBS data may be managed by MAC within a DU.

In some examples, when MBS is offered through multiple DUs, the RAN delivery across each DU may be observed and managed by the CU. A common PDCP may be configured per MRB and the PDCP within CU of a gNB may duplicate PDCP service data units (SDUs) associated with a MBS service flow to all DUs. In some examples, one RLC entity may be defined/tracked for each DU used for MBS transmission. The PDCP entity may duplicate PDCP SDU across all RLC entities associated with DU transmitted MBS data. In some examples, one PDCP instance may be configured for each DU and associated RLC entity.

In some examples, a common PDCP may be configured for transmission of multicast data associated with an MRB. In this case, the PDCP SDUs may be duplicated across all DUs and a unique RLC entity may be configured and tracked for SDU deliveries, for MBS transmission associated with each MRB on each DU.

In some examples, for each DU involved in MBS, a separate PDCP instance and RLC entity may be configured in the CU for each MRB.

In some examples, to improve reliability, a UE may be configured with multi-connectivity for reception of MBS at the beam, the remote unit (RU) or at the DU level. In some examples, to enable the multi-connectivity at the DU level, a UE may be configured with PDCP packet duplication.

In some examples, the PDCP packet duplication for the configured MRB(s) may be activated and deactivated by for all or a subset of associated RLC entities by receiving the PDCP packet duplication RLC Activation/Deactivation MAC CE or based on indication by RRC.

In some examples, a UE may be configured for multi-connectivity, at beam/RU or DU level, for reliable MBS reception. In some example, for MRB reception, the UE may be configured with PDCP duplication.

Figure 21B:
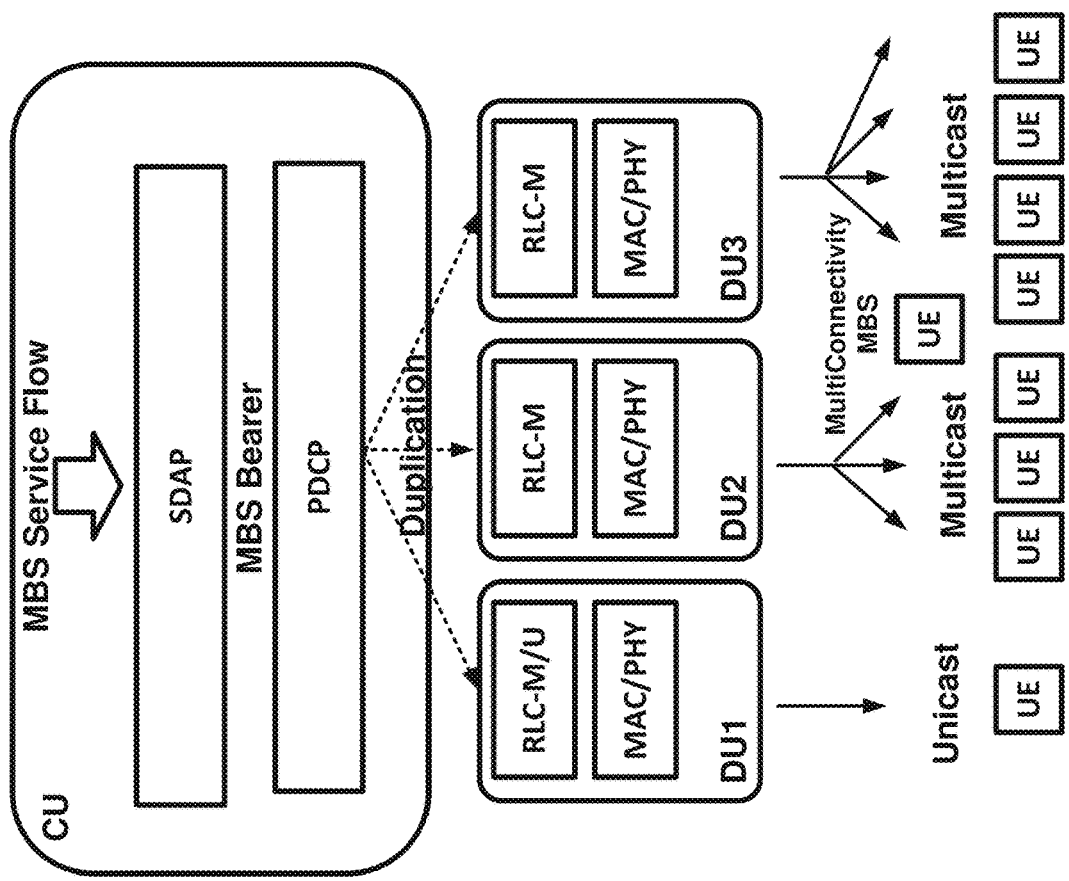
FIG. 21A and FIG. 21B show example configurations and processes according to some aspects of some of various exemplary embodiments of the present disclosure.
Figure 21A:
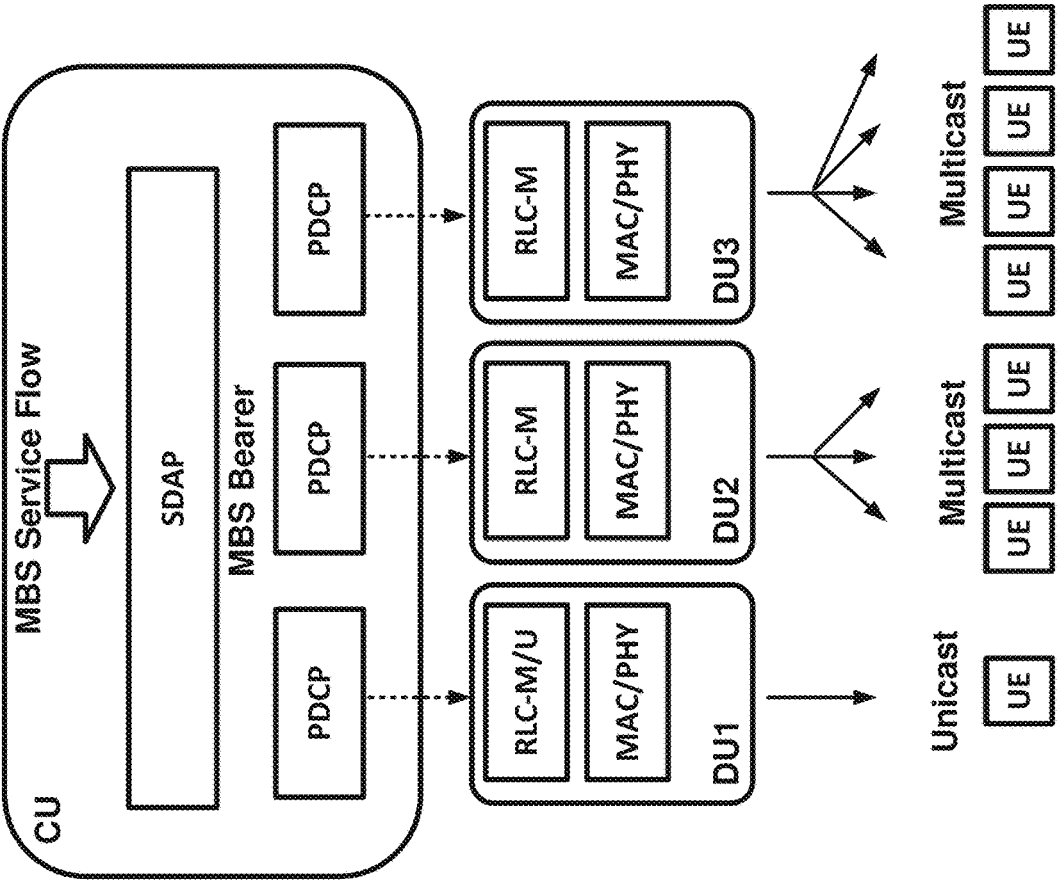

The concepts of Common PDCP, PDCP duplication and multi-connectivity with a common PDCP for all UEs in one DU and a common PDCP with duplication across DUs are shown in FIG. 21A and FIG. 21B.

In some examples, to enable in-sequence delivery by PDCP, a single sequence number may be maintained at the PDCP entity and the RLC may handle any retransmission. In some examples, one Sequence Number for each DU may be maintained so if retransmission at PDCP is needed it can be handled selectively for each DU. In some examples, the PDCP entity may maintain and track one SN for MBS data associated with an MRB for all DUs or may have separate SN for each DU.

Figure 22:
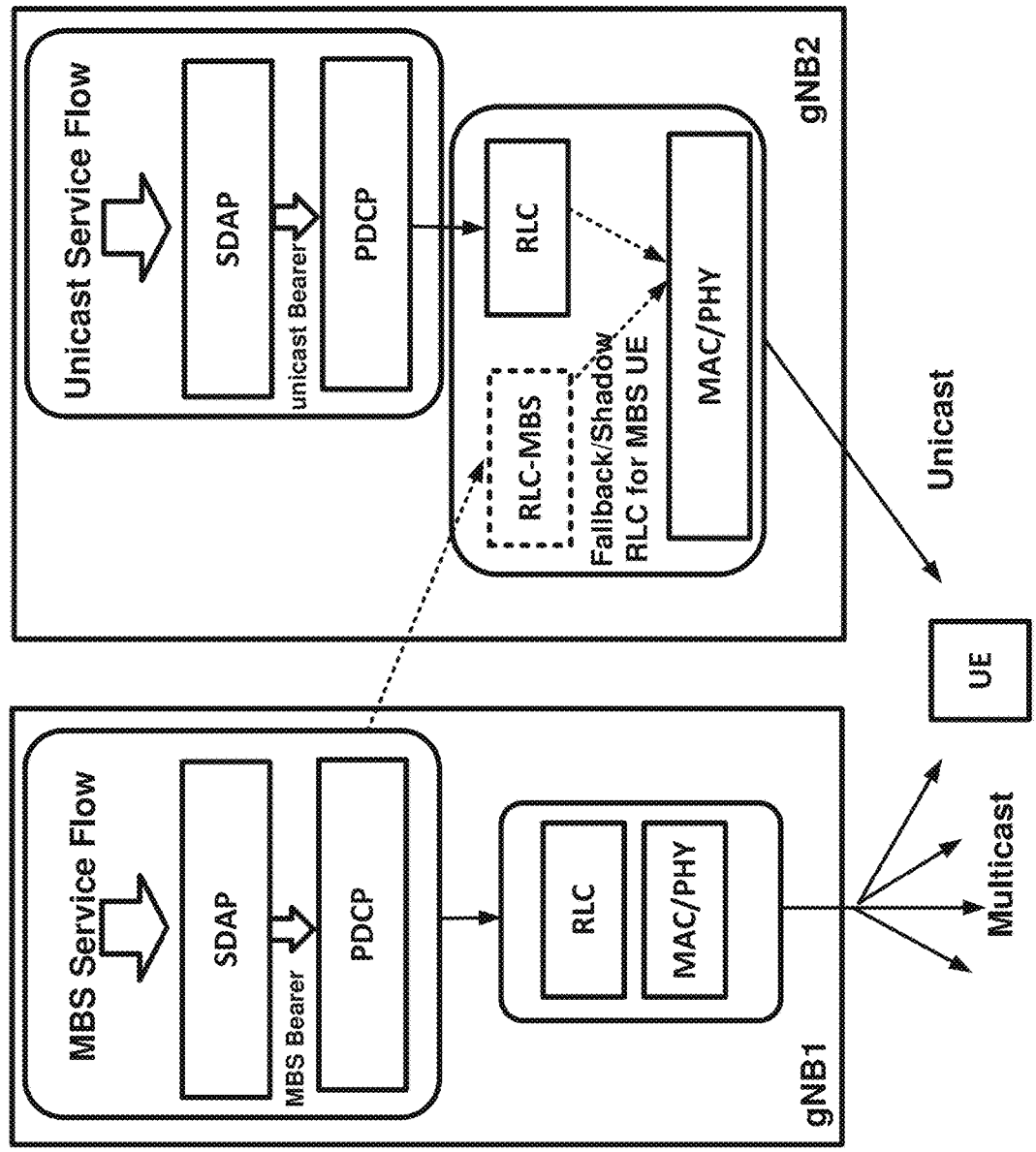
FIG. 22 shows an example configuration and process according to some aspects of some of various exemplary embodiments of the present disclosure.

In some examples, the PDCP may enable in-sequence delivery of MBS packets in dual connectivity cases or mobility between cells. In some examples, a UE may be in connected state in source cell and may start a new connection as part of HO with a target cell using Dual Active Protocol Stack (DAPS). The UE in connected state may maintain reception of MBS from source cell using the common PDCP while establishing a new connection with a target cell for unicast services. In some examples, a UE may be in connected state in both cells: this may be a dual connectivity scenarios where MBR may be delivered only from one cell, e.g. Cell 1, while some or all DRBs may be delivered by the other cell. In some examples, a UE may be connected with unicast cell, e.g. Cell 2 for unicast data, but may receive MBS from the Cell 1 without having an RRC connection to Cell 1. Example use of common PDCP for MBS reception by UEs in DC, DAP and Idle/Inactive States is shown in FIG. 22. In all cases, a UE may receive PDCP SDUs from the common PDCP and retransmission and if any unicast transmission is needed, they may be forwarded to cell 2. The common PDCP of a source MBS cell may be used to deliver MBS data to UEs in handover with DAPS and dual connectivity with a target cell or to idle/connected UEs which may be connected for unicast in nearby cells.

In some examples, header compression may be used for MBS services such as VoIP application for missional critical group calls and support for short packet transmissions in IIoT applications. In some examples, to support such use cases, header compressions may be used for IP and Ethernet packets. A variation of robust header compression (ROHC) may be used for IP traffic and the Ethernet header compression may be used for IIoT multicast traffic. In either case options may be considered with downlink only signaling if no feedback and uplink is used for MBS, e.g. in broadcast only mode.

In some examples, the ROHC scheme may have three modes of operation: Unidirectional, Bidirectional Optimistic, and Bidirectional Reliable mode. Which mode would be the best one in a certain situation may depend on the characteristics of the environment of the compression protocol, such as feedback abilities, error probabilities and distributions, effects of header size variation, etc. In some examples, header compression schemes without uplink feedback, such as Unidirectional mode of ROHC, may be used for those MBRs which do not require feedback channels.

In some examples, L2 encryption may be used for MBS data and such capability may be needed in some of MBS use cases in 5G. In some examples, a common encryption at PDCP layer may be used which may be configurable based on whether traffic is multicast with feedback or broadcast without feedback. The UEs may be given the Keyes at the time of registration with MBS service and key updates may be provided to UEs using unicast or multicast transmission. The UEs may move to connected state to support signaling needed for key updates. In some examples, Layer 2 encryption for MBS may be used at PDCP and key exchange and update signaling may be supported through unicast or multicast RRC signaling for UEs in connected state.

Figure 23:
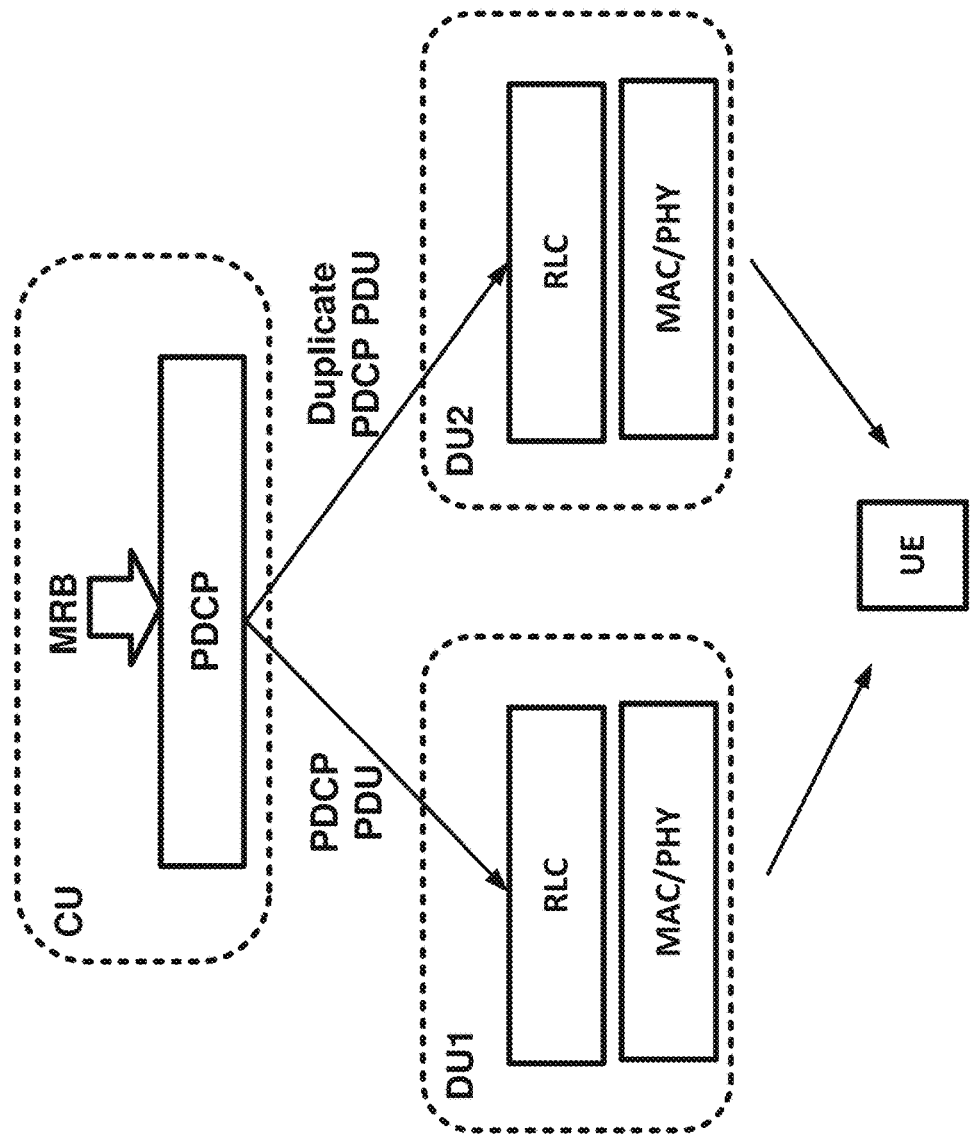
FIG. 23 shows an example configuration and process according to some aspects of some of various exemplary embodiments of the present disclosure.

In an example embodiment as shown in FIG. 23, a UE may receive one or more messages (e.g., one or more RRC messages) comprising configuration parameters of one or more cells. The configuration parameters may comprise first configuration parameter of a multicast radio bearer (MRB, also referred to as MBS radio bearer in this disclosure) associated with a first MBS service. The configuration parameters of the MRB may comprise one or more of an MRB identifier, parameters associated with the quality of service (QoS) requirements of the MRB, security parameters, PDCP configuration parameters associated with the MRB, etc. The UE may receive the configuration parameters from a base station (gNB) that comprises a central unit (CU) and a plurality of distributed units (DUs) comprising a first DU and a second DU. Some of the protocol terminations (e.g., PDCP) of the base station may reside in the CU and some of the protocol terminations may reside in the DUs (e.g., RLC, MAC, PHY). A PDCP entity may be established for the MRB at the CU of the gNB. In an example, the PDCP entity may be commonly established for the first DU and the second DU. The PDCP entity may be commonly established for a first RLC entity of the first DU and a second RLC entity of the second DU. The PDCP entity at the CU may utilize a PDCP duplication process to generate a PDCP PDU and a duplicate of the PDCP PDU. The PDCP entity may forward the PDCP PDU associated with the MRB to the first DU and the duplicate of the PDCP PDU to the second DU. The forwarding of the PDCP PDUs to the DUs may be based on F1 interfaces between the CU and the DUs. The first DU may receive the PDCP PDU via a first F1 interface and the second DU may receive the PDCP PDU via a second F1 interface. The PDCP PDU may be processed by the RLC and MAC/PHY established in the first DU (e.g., a first RLC and a first MAC/PHY) and the UE may receive a first transport block that comprises the PDCP PDU. In an example, the duplicate of the PDCP DU may be processed by the RLC and MAC/PHY established in the second DU (e.g., a second RLC and a second MAC/PHY). The second DU may transmit the duplicate of the PDCP PDU. In an example, the second DU may transmit a second transport block comprising the duplicate of the PDCP PDU. In an example, the second DU may transmit the second transport block to the UE. The UE may decode the first transport block and the second transport block to enhance the reliability of reception of the first MBS service data by transmitting both the PDCP PDU and a duplicate of the PDCP PDU to the UE. In some examples, the UE may receive a PDCP packet duplication activation signaling indicating activation of the packet duplication for the MRB at the UE.

Figure 24:
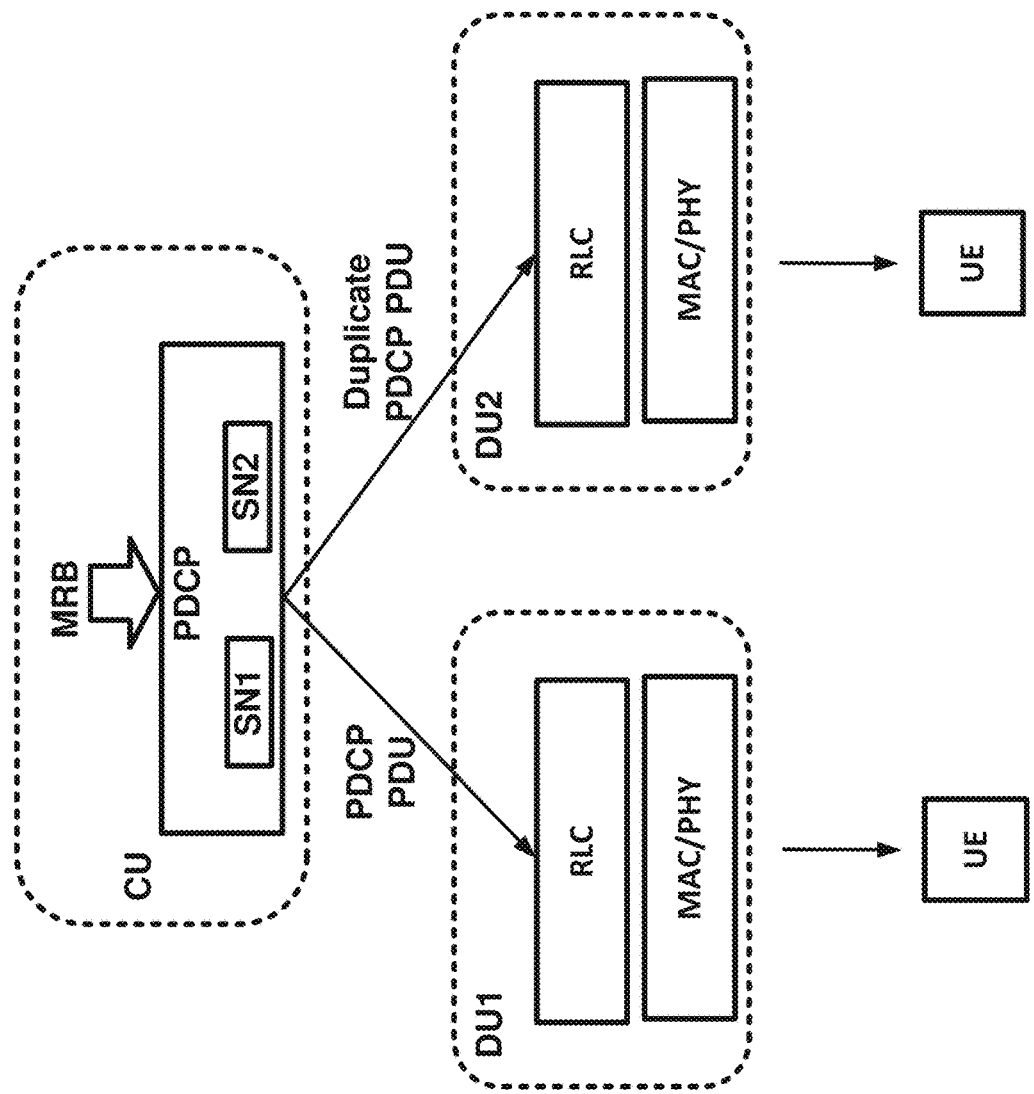
FIG. 24 shows an example configuration and process according to some aspects of some of various exemplary embodiments of the present disclosure.

In an example embodiment as shown in FIG. 24, a base station may comprise a central unit (CU), a first distributed unit (DU) and a second distributed unit (DU). The base station may establish, at the CU, at least one PDCP entity for an MRB associated with a first MBS service. In some examples, the at least one PDCP entity mat be established for both the MRB and a unicast radio bearer (e.g., a DRB) that are associated with the first MBS service and the base station may switch between the MRB and the DRB or use both MRB and DRB for delivering the first MBS service to the UEs. In some examples, the MRB (or the MRB and the DRB) may be acknowledged mode (AM) radio bearers and/or may be associated with RLC entities that use AM RLC functionalities. The at least one PDCP entity may utilize a PDCP packet duplication process to generate a PDCP PDU and a duplicate of the PDCP PDU. The PDCP PDU (and the duplicate PDCP PDU) may be generated based on an incoming IP packet of the first MBS service flow associated with the MRB (or the MRB and the DRB in case the at least one PDCP entity may be associated with both an MBS bearer and a unicast bearer). The PDCP PDU and the duplicate PDCP PDU may be forwarded (e.g., using F1 interfaces) to the first DU and the second DU respectively. In examples, the gNB may establish a first RLC entity at the first DU for processing the PDCP packet and a second RLC entity at the second DU for processing the duplicate PDCP packet. In some example, the at last one PDCP entity may be a single PDCP entity commonly established for the first RLC entity and the second RLC entity. In some examples, the at least one PDCP entity may comprise a first PDCP entity for the first RLC entity and a second PDCP entity for the second RLC entity. In some examples, the gNB may establish a first MAC entity associated with the first RLC entity at the first DU and a second MAC entity associated with the second RLC entity at the second DU. The first MAC entity may perform scheduling functions for one or more first UEs served by the first DU and the second MAC entity may perform scheduling functions for one or more second UEs served by the second DU.

The PDCP entity may maintain separate PDCP sequence numbers for the PDCP PDU and the duplicate of the PDCP PDU (e.g., a first PDCP SN for the PDCP PDU and a second PDCP SN for the duplicate of the PDCP PDU). The PDCP PDU may be processed by the RLC and MAC/PHY at the first DU and may be transmitted via the first DU and the duplicate PDCP PDU may be processed by the RLC and MAC/PHY at the second DU and may be transmitted via the second DU.

The PDCP entity may be triggered to retransmit PDCP packets. For example, the trigger for PDCP packet retransmission may be based on a PDCP packet re-establishment process. For example, the trigger for PDCP packet retransmission may be based on a handover procedure (e.g., a DAPS handover, etc.). For example, the trigger for PDCP packet retransmission may be in response to uplink data switching during a handover procedure (e.g., DAPS). In some examples, the handover procedure may use a sequence number (SN) status transfer procedure to transmit an SN status transfer message to a target base station. The SN status transfer message may comprise the first PDCP SN associated with the PDCP packet and the second PDCP SN associated with the duplicate PDCP packet. For example, the trigger for PDCP packet retransmission may be in response to an automatic repeat request (ARQ) process at the PDCP layer determining the retransmission of the PDCP packets. For example, the trigger for PDCP packet retransmission may be in response to a PDCP recovery procedure.

In response to the trigger for retransmission of the PDCP packets, the gNB may retransmit the PDCP packet based on the first PDCP SN and the second PDCP SN. For example, based on the firs PDCP SN and the second PDCP SN, the gNB may selectively retransmit the PDP packet via the first DU or the duplicate PDCP packet via the second DU. For example, the base station may retransmit at least one of: the first PDCP packet based on the first PDCP SN and the duplicate of the PDCP packet based on the second SN.

In an embodiment, a user equipment (UE) may receive from a base station (BS), configuration parameters of a multicast radio bearer (MRB) associated with a first MBS service, wherein the BS comprises a central unit (CU), a first distributed unit (DU) and a second DU. The UE may receive, from the first DU, a transport block associated with the MRB, wherein: the transport block may comprise a packet data convergence protocol (PDCP) packet; the first DU may receive the PDCP packet from a PDCP entity, established in the CU of the BS, via a first interface; the second DU may receive a duplicate of the PDCP packet from the PDCP entity via a second interface; and the duplicate of the PDCP packet may be transmitted via the second DU.

In some embodiments, a first radio link control (RLC) entity may be established in the first distributed unit (DU) for transmission of the first packet data convergence protocol (PDCP) packet; and a second RLC entity may be established in the second DU for transmission of the duplicate of the PDCP packet. In some embodiments, the packet data convergence protocol (PDCP) entity may be commonly established for the first radio link control (RLC) entity and the second RLC entity.

In some embodiments, the UE may receive a second transport block, comprising the duplicate of the packet data convergence protocol (PDCP) packet, from the second distributed unit (DU). In some embodiments, the UE may decode the transport block and the second transport block for enhancing reliability of reception of the first multicast broadcast service (MBS) service.

In some embodiments, the packet data convergence protocol (PDCP) entity may utilize a packet duplication process to generate the duplicate of the PDCP packet.

In some embodiments, the UE may receive a packet data convergence protocol (PDCP) packet duplication activation signaling indication activation of PDCP packet duplication for the multicast radio bearer (MRB).

In an embodiment, a base station (BS) may establish, at a central unit (CU) of the BS, at least one packet data convergence protocol (PDCP) entity for a multicast radio bearer (MRB) associated with a first MBS service. The base station may provide, via a PDCP entity, a first PDCP sequence number (SN) associated with a PDCP packet. The PDCP SN may be further associated with a first distributed unit (DU) of the BS. The base station may provide, via the PDCP entity, a second PDCP SN associated with a duplicate of the PDCP packet and further associated with a second DU of the BS. The base station may transmit at least one of the PDCP packet and the duplicate of the PDCP packet based on the first PDCP SN and the second PDCP SN.

In some embodiments, the base station may also establish a first radio link control (RLC) entity for the PDCP packet transmitted via the first distributed unit (DU). The base station may also establish a a second RLC entity for the duplicate of the PDCP packet transmitted via the second DU. In some embodiments, the first RLC entity is established at the first DU of the BS; and the second RLC entity is established at the second DU of the BS.

In some embodiments, the base station commonly establishes at least one PDCP entity for the first RLC entity and the second RLC entity. In some embodiments, the at least one PDCP entity corresponds to a first PDCP entity and a second PDCP entity. The first PDCP entity is established for the first RLC entity. The second PDCP entity is established for the second RLC entity.

In some embodiments, the base station further establishes a first medium access control (MAC) entity, associated with the first RLC entity, for transmission of a first MAC protocol data unit (PDU) via the first DU. The base station further establishes a second MAC entity, associated with the second RLC entity, for transmission of a second MAC PDU via the second DU. Still further, in some embodiments, the base station further establishes a data radio bearer (DRB) associated with the first MBS service.

In some embodiments, in response to a trigger for PDCP packet retransmission, the base station retransmits at least one of the PDCP packet and the duplicate of the PDCP packet based on the first PDCP SN and the second PDCP SN. In some embodiments, the trigger for the PDCP retransmission indicates a re-establishment of the PDCP entity. Additionally, in some embodiments, the trigger occurs in response to starting a handover procedure. In other embodiments, the trigger is in response to a PDCP data recovery procedure.

In an embodiment, a base station (BS) may establish, at a central unit (CU) of the BS, at least one packet data convergence protocol (PDCP) entity for a multicast radio bearer (MRB) associated with a first multicast broadcast service (MBS) service. The PDCP entity may maintain a first PDCP sequence numbers (SN) associated with a PDCP packet transmitted via a first distributed unit (DU) of the BS; and a second PDCP SN associated with a duplicate of the PDCP packet transmitted via a second DU of the BS. In response to a trigger for PDCP packet retransmission, the BS may retransmit at least one of the PDCP packet and the duplicate of the PDCP packet based on the first PDCP SN and the second PDCP SN.

In some embodiments, the base station may establish a first radio link control (RLC) entity for the first PDCP packet transmitted via the first distributed unit (DU); and a second RLC entity for the duplicate of the PDCP packet transmitted via the second DU. In some embodiments, the first radio link control (RLC) entity may be established at the first distributed unit (DU) of the base station (BS); and the second RLC entity may be established at the second DU of the BS. In some embodiments, the at least one packet data convergence protocol (PDCP) entity may be a single PDCP entity commonly established for the first radio link control (RLC) entity and the second RLC entity. In some embodiments, the at least one packet data convergence protocol (PDCP) entity may comprise a first PDCP entity, established for the first radio link control (RLC) entity, and a second PDCP entity, established for the second radio link control (RLC) entity. In some embodiments, the base station may establish: a first medium access control (MAC) entity, associated with the first radio link control (RLC) entity, for transmission of a first MAC protocol data unit (PDUs) via the first distributed unit (DU); and a second MAC entity, associated with the second RLC entity, for transmission of a second MAC PDU via the second DU.

In some embodiments, the at least one packet data convergence protocol (PDCP) entity may further be established for a data radio bearer (DRB) associated with the first MBS service.

In some embodiments, the at least one packet data convergence protocol (PDCP) entity may utilize a PDCP duplication process to generate the duplicate of the PDCP packet. In some embodiments, an internet protocol (IP) packet, associated with the multicast radio bearer (MRB), may be duplicated by the packet data convergence protocol (PDCP) duplication process to generate the first PDCP packet and the duplicate of the PDCP packet.

In some embodiments, the multicast radio bearer (MRB) may be an acknowledged mode (AM) radio bearer. In some embodiments, the first radio link control (RLC) entity and the second RLC entity may be acknowledged mode (AM) RLC entities.

In some embodiments, the trigger for packet data convergence protocol (PDCP) retransmission may indicate a re-establishment of the PDCP entity.

In some embodiments, the trigger may be in response to starting a handover procedure. In some embodiments, the handover procedure may be a dual active protocol stack (DAPS) handover. In some embodiments, the handover procedure may comprise uplink data switching.

In some embodiments, the handover procedure may comprise transmitting, by the base station (BS), a sequence number (SN) status transfer message to a target BS; and the SN status transfer message may comprise the first packet data convergence protocol (PDCP) SN associated with the PDCP packet and the second PDCP SN associated with the duplicate of the PDCP packet.

In some embodiments, the trigger may be in response to a packet data convergence protocol (PDCP) data recovery procedure.

In some embodiments, the first packet data convergence protocol (PDCP) sequence numbers (SN) and the second PDCP SN may have a fixed length that is one of twelve bits or eighteen bits.

In some embodiments, the first packet data convergence protocol (PDCP) sequence number (SN) may be included in a first header of the first PDCP packet; and the second PDCP SN may be included in a second header of the second PDCP packet.

In some embodiments, retransmitting the packet data convergence protocol (PDCP) packet may comprise at least one of: retransmitting the first PDCP packet based on the first PDCP sequence number (SN); and retransmitting the duplicate of the PDCP packet based on the second PDCP SN.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of multicast broadcast service (MBS) data transmission, comprising:

establishing, by a base station (BS) at a central unit (CU) of the BS, at least one packet data convergence protocol (PDCP) entity for a multicast radio bearer (MRB) associated with a first MBS service;

providing, by the PDCP entity, a first PDCP sequence number (SN) associated with a PDCP packet and further associated with a first distributed unit (DU) of the BS;

providing, by the PDCP entity, a second PDCP SN associated with a duplicate of the PDCP packet and further associated with a second DU of the BS; and transmitting, by the BS, at least one of the PDCP packet and the duplicate of the PDCP packet based on the first PDCP SN and the second PDCP SN.

Clause 2. The method of Clause 1 further comprising establishing by the BS:

a first radio link control (RLC) entity for the PDCP packet transmitted via the first distributed unit (DU); and a second RLC entity for the duplicate of the PDCP packet transmitted via the second DU.

Clause 3. The method of Clause 2, wherein:

the first RLC entity is established at the first DU of the BS; and the second RLC entity is established at the second DU of the BS.

Clause 4. The method of Clause 2, wherein the at least one PDCP entity is a single PDCP entity commonly established for the first RLC entity and the second RLC entity.

Clause 5. The method of Clause 2, wherein the at least one PDCP entity comprises a first PDCP entity, established for the first RLC entity, and a second PDCP entity, established for the second RLC entity.

Clause 6. The method of Clause 2 further comprising establishing:

a first medium access control (MAC) entity, associated with the first RLC entity, for transmission of a first MAC protocol data unit (PDU) via the first DU; and a second MAC entity, associated with the second RLC entity, for transmission of a second MAC PDU via the second DU.

Clause 7. The method of Clause 1 further comprising establishing a data radio bearer (DRB) associated with the first MBS service.

Clause 8. The method of claim 1 further comprising in response to a trigger for PDCP packet retransmission, retransmitting, by the BS, at least one of the PDCP packet and the duplicate of the PDCP packet based on the first PDCP SN and the second PDCP SN.

Clause 9. The method of Clause 8, wherein the trigger for the PDCP retransmission indicates a re-establishment of the PDCP entity.

Clause 10. The method of Clause 8, wherein the trigger occurs in response to starting a handover procedure.

Clause 11. The method of Clause 8, wherein the trigger is in response to a PDCP data recovery procedure.

Clause 12. A method of multicast broadcast service (MBS) data transmission, comprising:

establishing, by a base station (BS) at a central unit (CU) of the BS, at least one packet data convergence protocol (PDCP) entity for a multicast radio bearer (MRB) associated with a first MBS service;

maintaining, by the PDCP entity:

a first PDCP sequence number (SN) associated with a PDCP packet transmitted via a first distributed unit (DU) of the BS; and a second PDCP SN associated with a duplicate of the PDCP packet transmitted via a second DU of the BS; and in response to a trigger for PDCP packet retransmission, retransmitting, by the BS, at least one of the PDCP packet and the duplicate of the PDCP packet based on the first PDCP SN and the second PDCP SN.

Clause 13. The method of Clause 12 further comprising establishing by the base station:

a first radio link control (RLC) entity for the PDCP packet transmitted via the first DU; and a second RLC entity for the duplicate of the PDCP packet transmitted via the second DU.

Clause 14. The method of Clause 13, wherein:

the RLC entity is established at the first DU of the BS; and the second RLC entity is established at the second DU of the BS.

Clause 15. The method of Clause 13, wherein the at least one PDCP entity is a single PDCP entity commonly established for the first RLC entity and the second RLC entity.

Clause 16. The method of Clause 13, wherein the at least one PDCP entity comprises a first PDCP entity, established for the first RLC entity, and a second PDCP entity, established for the second RLC entity.

Clause 17. The method of Clause 13 further comprising establishing:

a first medium access control (MAC) entity, associated with the first radio link control (RLC) entity, for transmission of a first MAC protocol data unit (PDU) via the first distributed unit (DU); and a second MAC entity, associated with the second RLC entity, for transmission of a second MAC PDU via the second DU.

Clause 18. The method of Clause 12 further comprising establishing a data radio bearer (DRB) associated with the first MBS service.

Clause 19. The method of Clause 12 further comprising generating, by the PDCP entity, the duplicate of the PDCP packet utilizing a PDCP duplication process.

Clause 20. The method of Clause 19, wherein an internet protocol (IP) packet, associated with the MRB, is duplicated by the PDCP duplication process to generate the first PDCP packet and the duplicate PDCP packet.

Clause 21. The method of Clause 12, wherein the multicast radio bearer (MRB) is an acknowledged mode (AM) radio bearer.

Clause 22. The method of Clause 21, wherein the first radio link control (RLC) entity and the second RLC entity are acknowledged mode (AM) RLC entities.

Clause 23. The method of Clause 12, wherein the trigger for the packet data convergence protocol (PDCP) retransmission indicates a re-establishment of the PDCP entity.

Clause 24. The method of Clause 12, wherein the trigger occurs in response to starting a handover procedure.

Clause 25. The method of Clause 24, wherein the handover procedure is a dual active protocol stack (DAPS) handover.

Clause 26. The method of Clause 24, wherein the handover procedure comprises uplink data switching.

Clause 27. The method of Clause 24, wherein:

the handover procedure comprises transmitting, by the base station (BS), a sequence number (SN) status transfer message to a target BS; and the SN status transfer message comprises the first PDCP SN associated with the PDCP packet and the second PDCP SN associated with the duplicate of the PDCP packet.

Clause 28. The method of Clause 12, wherein the trigger is in response to a PDCP data recovery procedure.

Clause 29. The method of Clause 12, wherein the first PDCPSN and the second PDCP SN have respective fixed lengths that are either twelve bits or eighteen bits.

Clause 30. The method of Clause 12, wherein:

the first PDCP SN is included in a first header of the first PDCP packet; and the second PDCP SN is included in a second header of the duplicate PDCP packet.

Clause 31. The method of Clause 12, wherein retransmitting the PDCP packet comprises at least one of:

retransmitting the first PDCP packet based on the first PDCP sequence number (SN); and retransmitting the duplicate PDCP packet based on the second PDCP SN.

Clause 33. An apparatus for utilization in wireless communications comprising:

an antenna for use in transmission of electromagnetic signals;

a memory for maintaining computer-readable code; and a processor for executing the computer-readable code that causes the apparatus to:

establish, at a central unit (CU), at least one packet data convergence protocol (PDCP) entity for a multicast radio bearer (MRB) associated with a first MBS service;

provide, by the PDCP entity, a first PDCP sequence number (SN) associated with a PDCP packet and further associated with a first distributed unit (DU) of the BS;

provide, by the PDCP entity, a second PDCP SN associated with a duplicate of the PDCP packet and further associated with a second DU of the BS; and transmit at least one of the PDCP packet and the duplicate of the PDCP packet based on the first PDCP SN and the second PDCP SN.

Clause 34. The apparatus of Clause 33, wherein the apparatus establishes:

a first radio link control (RLC) entity for the PDCP packet transmitted via the first distributed unit (DU); and a second RLC entity for the duplicate of the PDCP packet transmitted via the second DU.

Clause 35. The apparatus of Clause 34, wherein:

the first RLC entity is established at the first DU; and the second RLC entity is established at the second DU.

Clause 36. The apparatus of Clause 34, wherein the at least one PDCP entity is a single PDCP entity commonly established for the first RLC entity and the second RLC entity.

Clause 37. The apparatus of Clause 34, wherein the at least one PDCP entity comprises a first PDCP entity, established for the first RLC entity, and a second PDCP entity, established for the second RLC entity.

Clause 38. The apparatus of Clause 34, wherein the apparatus establishes:

a first medium access control (MAC) entity, associated with the first RLC entity, for transmission of a first MAC protocol data unit (PDU) via the first DU; and a second MAC entity, associated with the second RLC entity, for transmission of a second MAC PDU via the second DU.

Clause 39. The apparatus of Clause 33, wherein the apparatus establishes a data radio bearer (DRB) associated with the first MBS service.

Clause 40. The apparatus of Clause 33, wherein in response to a trigger for PDCP packet retransmission, the apparatus retransmits at least one of the PDCP packet and the duplicate of the PDCP packet based on the first PDCP SN and the second PDCP SN.

Clause 42. The apparatus of Clause 40, wherein the trigger for the PDCP retransmission indicates a re-establishment of the PDCP entity.

Clause 43. The apparatus of Clause 40, wherein the trigger occurs in response to starting a handover procedure.

Clause 44. The apparatus of Clause 40, wherein the trigger is in response to a PDCP data recovery procedure.

Clause 45. An apparatus for utilization in wireless communications comprising:

an antenna for use in transmission of electromagnetic signals;

a memory for maintaining computer-readable code; and a processor for executing the computer-readable code that causes the apparatus to:

establish at a central unit (CU), at least one packet data convergence protocol (PDCP) entity for a multicast radio bearer (MRB) associated with a first MBS service;

maintain, by the PDCP entity:

a first PDCP sequence number (SN) associated with a PDCP packet transmitted via a first distributed unit (DU) of the BS; and a second PDCP SN associated with a duplicate of the PDCP packet transmitted via a second DU of the BS; and in response to a trigger for PDCP packet retransmission, retransmit at least one of the PDCP packet and the duplicate of the PDCP packet based on the first PDCP SN and the second PDCP SN.

Clause 46. The apparatus of Clause 45, wherein the apparatus establishes:

a first radio link control (RLC) entity for the PDCP packet transmitted via the first DU; and a second RLC entity for the duplicate of the PDCP packet transmitted via the second DU.

Clause 47. The apparatus of Clause 46, wherein:

the RLC entity is established at the first DU; and the second RLC entity is established at the second DU.

Clause 48. The apparatus of Clause 46, wherein the at least one PDCP entity is a single PDCP entity commonly established for the first RLC entity and the second RLC entity.

Clause 49. The apparatus of Clause 46, wherein the at least one PDCP entity comprises a first PDCP entity, established for the first RLC entity, and a second PDCP entity, established for the second RLC entity.

Clause 50. The apparatus of Clause 46, wherein the apparatus establishes:

a first medium access control (MAC) entity, associated with the first radio link control (RLC) entity, for transmission of a first MAC protocol data unit (PDU) via the first distributed unit (DU); and a second MAC entity, associated with the second RLC entity, for transmission of a second MAC PDU via the second DU.

Clause 51. The apparatus of Clause 45, wherein the apparatus establishes a data radio bearer (DRB) associated with the first MBS service.

Clause 52. The apparatus of Clause 45, wherein the apparatus generates the duplicate of the PDCP packet utilizing a PDCP duplication process.

Clause 53. The apparatus of Clause 52, wherein an internet protocol (IP) packet, associated with the MRB, is duplicated by the PDCP duplication process to generate the first PDCP packet and the duplicate PDCP packet.

Clause 54. The apparatus of Clause 45, wherein the multicast radio bearer (MRB) is an acknowledged mode (AM) radio bearer.

Clause 55. The apparatus of Clause 54, wherein the first radio link control (RLC) entity and the second RLC entity are acknowledged mode (AM) RLC entities.

Clause 56. The apparatus of Clause 45, wherein the trigger for the packet data convergence protocol (PDCP) retransmission indicates a re-establishment of the PDCP entity.

Clause 57. The apparatus of Clause 45, wherein the trigger occurs in response to starting a handover procedure.

Clause 58. The apparatus of Clause 57, wherein the handover procedure is a dual active protocol stack (DAPS) handover.

Clause 59. The apparatus of Clause 57, wherein the handover procedure comprises uplink data switching.

Clause 60. The apparatus of Clause 57, wherein:

the handover procedure comprises transmitting, by the base station (BS), a sequence number (SN) status transfer message to a target BS; and the SN status transfer message comprises the first PDCP SN associated with the PDCP packet and the second PDCP SN associated with the duplicate of the PDCP packet.

Clause 61. The apparatus of Clause 47, wherein the trigger is in response to a PDCP data recovery procedure.

Clause 62. The apparatus of Clause 45, wherein the first PDCPSN and the second PDCP SN have respective fixed lengths that are either twelve bits or eighteen bits.

Clause 63. The apparatus of Clause 45, wherein:

the first PDCP SN is included in a first header of the first PDCP packet; and the second PDCP SN is included in a second header of the duplicate PDCP packet.

Clause 64. The apparatus of Clause 45, wherein retransmitting the PDCP packet comprises at least one of:

retransmitting the first PDCP packet based on the first PDCP sequence number (SN); and retransmitting the duplicate PDCP packet based on the second PDCP SN.

Clause 65. A method of multicast broadcast service (MBS) data transmission, comprising:

receiving, by a user equipment (UE) from a base station (BS), configuration parameters of a multicast radio bearer (MRB) associated with a first MBS service, wherein the BS comprises a central unit (CU), a first distributed unit (DU) and a second DU; and receiving, by the UE from the first DU, a transport block associated with the MRB, wherein the first transport block comprises a packet data convergence protocol (PDCP) packet and wherein the first DU receives the PDCP packet from a PDCP entity, established in the CU of the BS, via a first interface;

the second DU receives a duplicate of the PDCP packet from the PDCP entity via a second interface; and the duplicate of the PDCP packet is transmitted via the second DU.

Clause 66. The method of Clause 65, wherein a first radio link control (RLC) entity is established in the first distributed unit (DU) for transmission of the packet data convergence protocol (PDCP) packet; and a second RLC entity is established in the second DU for transmission of the duplicate of the PDCP packet.

Clause 67. The method of Clause 66, wherein the packet data convergence protocol (PDCP) entity is commonly established for the first radio link control (RLC) entity and the second RLC entity.

Clause 68. The method of Clause 65 further comprising receiving a second transport block, comprising the duplicate of the packet data convergence protocol (PDCP) packet, from the second distributed unit (DU).

Clause 69. The method of Clause 68 further comprising decoding the first transport block and the second transport block for enhancing reliability of reception of the first multicast broadcast service (MBS).

Clause 70. The method of Clause 68, wherein the packet data convergence protocol (PDCP) entity utilizes a packet duplication process to generate the duplicate of the PDCP packet.

Clause 71. The method of Clause 1, further comprising receiving a packet data convergence protocol (PDCP) packet duplication activation signaling indicating activation of PDCP packet duplication for the multicast radio bearer (MRB).

The invention claimed is:

1. A method of multicast broadcast service (MBS) data transmission comprising:
    establishing, by a base station (BS) at a central unit (CU) of the BS, at least one packet data convergence protocol (PDCP) entity for a multicast radio bearer (MRB) associated with a first MBS service;
    providing, by the PDCP entity, a first PDCP sequence number (SN) associated with a PDCP packet and further associated with a first distributed unit (DU) of the BS;
    providing, by the PDCP entity, a second PDCP SN associated with a duplicate of the PDCP packet and further associated with a second DU of the BS; and
    transmitting, by the BS, at least one of the PDCP packet and the duplicate of the PDCP packet based on the first PDCP SN and the second PDCP SN.

2. The method of claim 1 further comprising establishing by the BS:
    a first radio link control (RLC) entity for the PDCP packet transmitted via the first distributed unit (DU); and
    a second RLC entity for the duplicate of the PDCP packet transmitted via the second DU.

3. The method of claim 2, wherein:
    the first RLC entity is established at the first DU of the BS; and
    the second RLC entity is established at the second DU of the BS.

4. The method of claim 2, wherein the at least one PDCP entity is a single PDCP entity commonly established for the first RLC entity and the second RLC entity.

5. The method of claim 2, wherein the at least one PDCP entity comprises a first PDCP entity, established for the first RLC entity, and a second PDCP entity, established for the second RLC entity.

6. The method of claim 2 further comprising establishing:
    a first medium access control (MAC) entity, associated with the first RLC entity, for transmission of a first MAC protocol data unit (PDU) via the first DU; and
    a second MAC entity, associated with the second RLC entity, for transmission of a second MAC PDU via the second DU.

7. The method of claim 1 further comprising establishing a data radio bearer (DRB) associated with the first MBS service.

8. The method of claim 1 further comprising in response to a trigger for PDCP packet retransmission, retransmitting, by the BS, at least one of the PDCP packet and the duplicate of the PDCP packet based on the first PDCP SN and the second PDCP SN.

9. The method of claim 8, wherein the trigger for the PDCP retransmission indicates a re-establishment of the PDCP entity.

10. The method of claim 8, wherein the trigger occurs in response to starting a handover procedure.

11. The method of claim 8, wherein the trigger is in response to a PDCP data recovery procedure.

12. A method of multicast broadcast service (MBS) data transmission, comprising:
    establishing, by a base station (BS) at a central unit (CU) of the BS, at least one packet data convergence protocol (PDCP) entity for a multicast radio bearer (MRB) associated with a first MBS service;
    maintaining, by the PDCP entity:
        a first PDCP sequence number (SN) associated with a PDCP packet transmitted via a first distributed unit (DU) of the BS; and
        a second PDCP SN associated with a duplicate of the PDCP packet transmitted via a second DU of the BS; and
    in response to a trigger for PDCP packet retransmission, retransmitting, by the BS, at least one of the PDCP packet and the duplicate of the PDCP packet based on the first PDCP SN and the second PDCP SN.

13. The method of claim 12 further comprising establishing by the base station:
    a first radio link control (RLC) entity for the PDCP packet transmitted via the first DU; and
    a second RLC entity for the duplicate of the PDCP packet transmitted via the second DU.

14. The method of claim 13, wherein:
    the RLC entity is established at the first DU of the BS; and
    the second RLC entity is established at the second DU of the BS.

15. The method of claim 13, wherein the at least one PDCP entity is a single PDCP entity commonly established for the first RLC entity and the second RLC entity.

16. The method of claim 13, wherein the at least one PDCP entity comprises a first PDCP entity, established for the first RLC entity, and a second PDCP entity, established for the second RLC entity.

17. The method of claim 13 further comprising establishing:
- a first medium access control (MAC) entity, associated with the first radio link control (RLC) entity, for transmission of a first MAC protocol data unit (PDU) via the first distributed unit (DU); and
- a second MAC entity, associated with the second RLC entity, for transmission of a second MAC PDU via the second DU.

18. The method of claim 12 further comprising establishing a data radio bearer (DRB) associated with the first MBS service.

19. The method of claim 12 further comprising generating, by the PDCP entity, the duplicate of the PDCP packet utilizing a PDCP duplication process.

20. The method of claim 19, wherein an internet protocol (IP) packet, associated with the MRB, is duplicated by the PDCP duplication process to generate the first PDCP packet and the duplicate PDCP packet.

21. The method of claim 12, wherein the multicast radio bearer (MRB) is an acknowledged mode (AM) radio bearer.

22. The method of claim 21, wherein the first radio link control (RLC) entity and the second RLC entity are acknowledged mode (AM) RLC entities.

23. The method of claim 12, wherein the trigger for the packet data convergence protocol (PDCP) retransmission indicates a re-establishment of the PDCP entity.

24. The method of claim 12, wherein the trigger occurs in response to starting a handover procedure.

25. The method of claim 24, wherein the handover procedure is a dual active protocol stack (DAPS) handover.

26. The method of claim 24, wherein the handover procedure comprises uplink data switching.

27. The method of claim 24, wherein:
- the handover procedure comprises transmitting, by the base station (BS), a sequence number (SN) status transfer message to a target BS; and
- the SN status transfer message comprises the first PDCP SN associated with the PDCP packet and the second PDCP SN associated with the duplicate of the PDCP packet.

28. The method of claim 12, wherein the trigger is in response to a PDCP data recovery procedure.

29. The method of claim 12, wherein the first PDCP SN and the second PDCP SN have respective fixed lengths that are either twelve bits or eighteen bits.

30. The method of claim 12, wherein:
- the first PDCP SN is included in a first header of the first PDCP packet; and
- the second PDCP SN is included in a second header of the duplicate PDCP packet.

31. The method of claim 12, wherein retransmitting the PDCP packet comprises at least one of:
- retransmitting the first PDCP packet based on the first PDCP sequence number (SN); and
- retransmitting the duplicate PDCP packet based on the second PDCP SN.

\* \* \* \* \*